(12) United States Patent
Petersen et al.

(10) Patent No.: US 11,425,811 B2
(45) Date of Patent: Aug. 23, 2022

(54) CONTROLLING GROUPS OF ELECTRICAL LOADS

(71) Applicant: Lutron Technology Company LLC, Coopersburg, PA (US)

(72) Inventors: Alexander S. Petersen, Coopersburg, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 140 days.

(21) Appl. No.: 16/875,663

(22) Filed: May 15, 2020

(65) Prior Publication Data
US 2020/0367346 A1  Nov. 19, 2020

Related U.S. Application Data

(60) Provisional application No. 62/849,521, filed on May 17, 2019.

(51) Int. Cl.
| | | |
|---|---|---|
| *H05B 47/19* | (2020.01) | |
| *H05B 47/165* | (2020.01) | |
| *H05B 47/105* | (2020.01) | |
| *H05B 41/39* | (2006.01) | |

(52) U.S. Cl.
CPC .......... *H05B 47/19* (2020.01); *H05B 41/39* (2013.01); *H05B 47/105* (2020.01); *H05B 47/165* (2020.01)

(58) Field of Classification Search
CPC .... H05B 47/19; H05B 47/165; H05B 47/105; H05B 41/39; H05B 45/10
See application file for complete search history.

(56) References Cited

U.S. PATENT DOCUMENTS

| | | |
|---|---|---|
| 5,264,761 A | 11/1993 | Johnson |
| 7,834,856 B2 | 11/2010 | Grinshpoon et al. |
| 8,009,042 B2 | 8/2011 | Steiner et al. |
| 8,330,638 B2 | 12/2012 | Altonen et al. |
| 8,451,116 B2 | 5/2013 | Steiner et al. |
| 8,471,779 B2 | 6/2013 | Mosebrook |
| 8,950,461 B2 | 2/2015 | Adams et al. |
| 9,115,537 B2 | 8/2015 | Blair |

(Continued)

FOREIGN PATENT DOCUMENTS

CN  2596671 Y  12/2003

*Primary Examiner* — Raymond R Chai
(74) *Attorney, Agent, or Firm* — Flaster Greenberg, P.C.

(57) ABSTRACT

A remote control device may be configured to transmit command messages based on user interactions. The remote control device may receive an indication of a user interaction and transmit a command message based on the indication of the user interaction. The command message may include a command to adjust an intensity level of a lighting device and a fade period. The fade period may include the period of time over which the lighting device is to transition to the intensity level. After a transmission interval period of time from when the command message was transmitted elapses and based on a subsequent user interaction, the remote control device may transmit another command message, which may include a command for the lighting device to adjust to another intensity level over the fade period. The fade period may be longer than the transmission interval.

41 Claims, 12 Drawing Sheets

(56) References Cited

U.S. PATENT DOCUMENTS

| | | |
|---|---|---|
| 9,208,965 B2 | 12/2015 | Busby et al. |
| 9,368,025 B2 | 6/2016 | Carmen, Jr. |
| 9,418,802 B2 | 8/2016 | Romano et al. |
| 9,520,247 B1 | 12/2016 | Finnegan et al. |
| 9,583,288 B2 | 2/2017 | Jones et al. |
| 9,674,931 B1 | 6/2017 | Chen et al. |
| 9,799,469 B2 | 10/2017 | Bailey et al. |
| 9,959,997 B2 | 5/2018 | Bailey et al. |
| 10,027,127 B2 | 7/2018 | Crafts et al. |
| 10,271,407 B2 | 4/2019 | Pessina et al. |
| 10,420,194 B2 | 9/2019 | Mann |
| 2008/0111491 A1 | 5/2008 | Spira |
| 2012/0292174 A1 | 11/2012 | Mah et al. |
| 2015/0061539 A1 | 3/2015 | Hirayama et al. |
| 2015/0077021 A1 | 3/2015 | Smith et al. |
| 2015/0371534 A1 | 12/2015 | Dimberg et al. |
| 2015/0373810 A1* | 12/2015 | Aliakseyeu .......... H05B 47/155 315/292 |
| 2016/0073479 A1 | 3/2016 | Erchak et al. |
| 2016/0381770 A1* | 12/2016 | Murakami ............. H04W 4/70 315/291 |
| 2017/0105176 A1 | 4/2017 | Finnegan et al. |
| 2017/0223801 A1 | 8/2017 | Gan et al. |
| 2018/0190451 A1 | 7/2018 | Scruggs |

\* cited by examiner

CONTROLLING GROUPS OF ELECTRICAL LOADS

CROSS-REFERENCE TO RELATED APPLICATIONS

This application claims priority from U.S. Provisional Patent Application No. 62/849,521, filed May 17, 2019, which is hereby incorporated by reference in its entirety.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device may be used to communicate with lighting devices (e.g., light bulbs) in the load control system to control the intensity level (e.g., a brightness or lighting level) of the lighting devices.

Lighting devices in the user environment may be collectively controlled by a common lighting control device that is capable of dimming the group of lighting devices and/or toggling the group of lighting devices on and off. Multiple lighting devices in the system may be independently controlled by another lighting control device. Control of the lighting devices may be based on a user interaction at the lighting control device. The user interaction may span a period of time, over which the lighting control device may transmit multiple wireless signals. The wireless signals may include a command to control the lighting devices. As the signals are transmitted wirelessly, one or more of the wireless signals may not be successfully received. Further, the lighting devices may become out of sync with one another and/or may not be controlled in a uniform manner. For example, one lighting device may receive a wireless signal causing the lighting device to change its intensity level, while another lighting device fails to receive the wireless signal. The lighting device that fails to receive the wireless signal may not change its intensity level. The two lighting devices may be configured to change intensity level in unison, however, as a lighting device fails to receive all the wireless signals, the lighting devices may become out of sync (e.g., the lighting devices not change their intensity level in unison). Similarly, it may appear to a user that the lighting control device is not functioning properly (e.g., the lighting device is unable to control the lighting devices) and may result in a poor user experience.

SUMMARY

A remote control device may be configured to transmit command messages based on user interactions. The remote control device may receive an indication of a user interaction via a user interface. The remote control device may transmit a first command message based on the indication of the user interaction. The first command message may include a command to adjust the intensity level at a lighting device and a fade period. The fade period may include the period of time over which the lighting device is to transition to the intensity level included in a respective command message. After a transmission interval period of time from when the first command message was transmitted and based on a subsequent user interaction, the remote control device may transmit a second command message. The second command message may include a command for the lighting device to adjust to another intensity level over the fade period. The fade period may be longer than the transmission interval (e.g. twice as long as the transmission interval).

The remote control device may be configured to periodically transmit command messages and/or repeat command messages while a rotation portion is being rotated. The user interface of the remote control device may include a rotation portion and a user interaction may include rotation of the rotation portion. The intensity level included in a respective command message may be based on an amount of rotation of the rotation portion. For example, the intensity level included in the second command message may be based on the intensity level included in the first command message and the amount of rotation of the rotation portion during the transmission interval.

The remote control device may be configured to transmit a repeat command message between respective command messages. For example, a repeat command message may be transmitted between the first command message and the second command message. The repeat command message may be a repeat of the first command message. The repeat command message may be transmitted at a repeat interval from the beginning of a present transmission interval (e.g., a repeat interval period of time since the first command message was transmitted).

A remote control device may be configured to periodically transmit command messages and/or repeat command messages during successive user interactions. The remote control device may receive an indication of a first user interaction (e.g., rotation of the rotation portion). In response to the first user interaction, the remote control device may transmit first command messages. The remote control device may periodically transmit command messages at a transmission interval in response to successive user interactions (e.g., continued rotation of the rotation portion). The periodically transmitted command messages may each include a command to adjust to a respective intensity level (e.g., based on the amount of rotation since the beginning of a respective transmission interval) over the fade period. The remote control device may transmit at least one repeat command message between the periodic transmission of command message. The repeat command messages may be transmitted at a repeat interval from the beginning of a present transmission interval. The repeat command message may include the respective command of the command message transmitted at the beginning of the present transmission interval. After the successive user interactions have ceased, the remote control device may transmit a plurality of repeat command messages at the repeat interval.

DETAILED DESCRIPTION

Figure 1A:
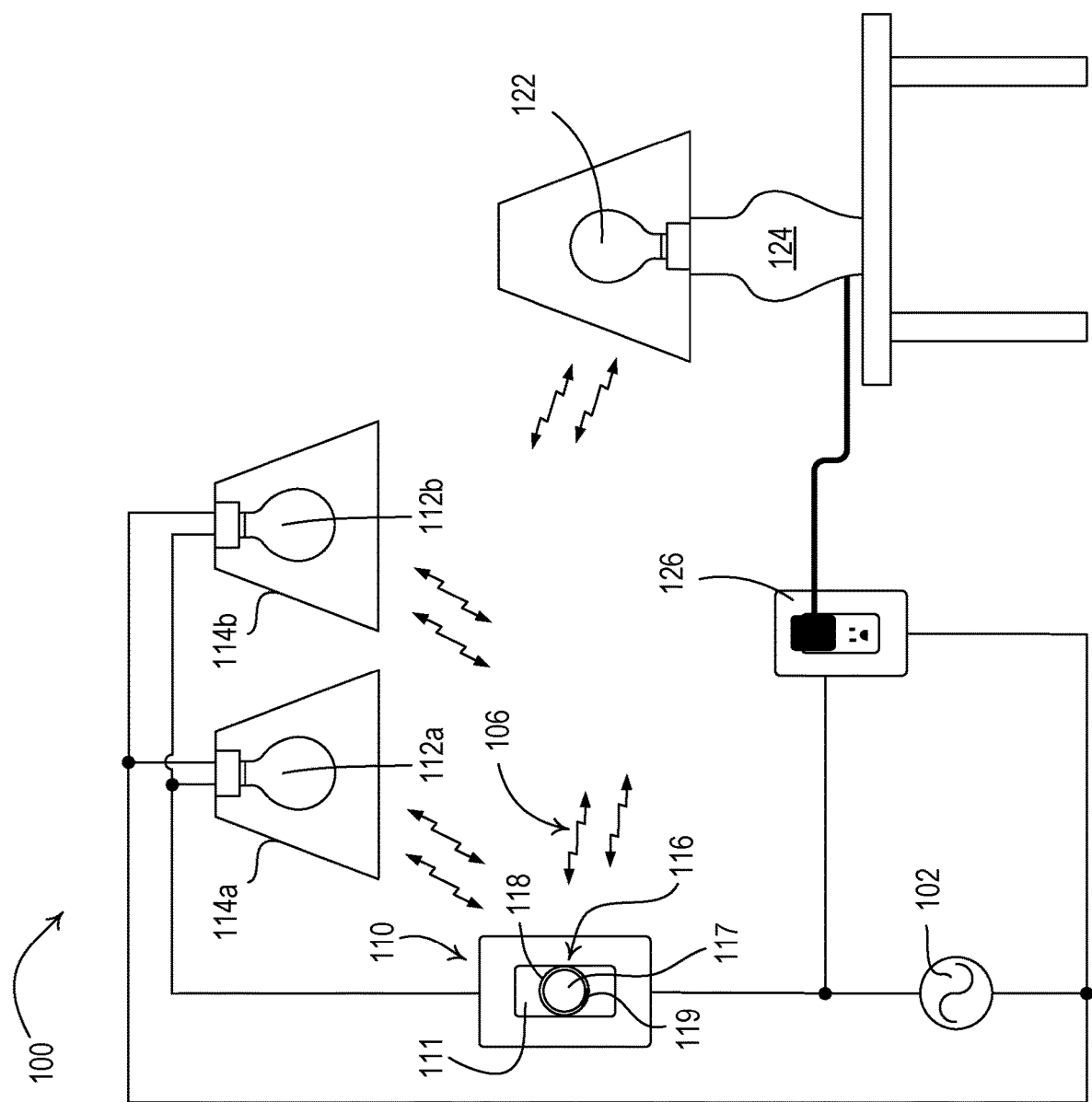
FIGS. 1A and 1B depict examples of a load control system that may implement one or more message types for communicating digital messages.
Figure 1B:
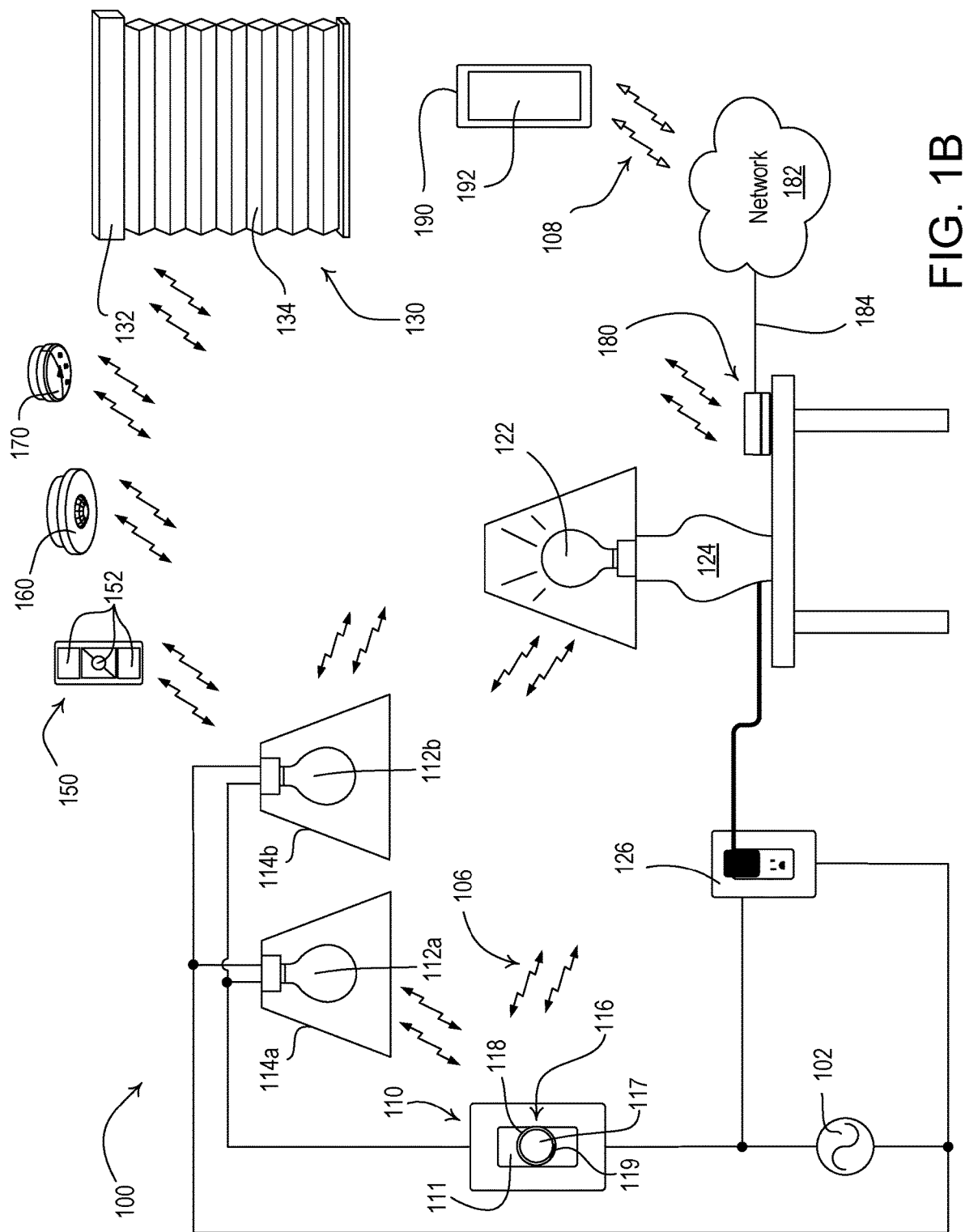

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. The controller device may send digital messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from a controller device. Example load control devices may include lighting devices 112a, 112b and/or lighting device 122 (e.g., a load control device in light bulbs, ballasts, LED drivers, etc.). The lighting devices may be a lighting load itself, or a device that includes the lighting load and a lighting load controller.

A controller device may indirectly control the amount of power provided to an electrical load by transmitting digital messages to the load control device. The digital messages may include control instructions (e.g., load control instructions) or another indication that causes the load control device to determine load control instructions for controlling an electrical load. Example controller devices may include a remote control device 116. The controller devices may include a wired or wireless device.

Control devices (e.g., controller devices and/or load control devices) may communicate with each other and/or other devices via wired and/or wireless communications. The control devices may communicate using digital messages in a wireless signal. For example, the control devices may communicate via radio frequency (RF) signals 106. The RF signals 106 may be communicated via an RF communication protocol (e.g., ZIGBEE; THREAD; near field communication (NFC); BLUETOOTH; BLUETOOTH LOW ENERGY (BLE), WI-FI; a proprietary communication protocol, such as CLEAR CONNECT or CLEAR CONNECT TYPE X, etc.). The digital messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112a, 112b may be controlled by a wall-mounted load control device 110. Though the lighting devices 112a, 112b are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112a, 112b. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112a, 112b (e.g., for turning on and off the lighting devices 112a, 112b). The lighting devices 112a, 112b may be installed in respective ceiling mounted downlight fixtures 114a, 114b or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112a, 112b. For example, the remote control device 116 may be configured to transmit messages via the RF signals 106 to load control devices (e.g., the lighting devices 112a, 112b) that are within a wireless communication range of the remote control device. The remote control device 116 may be battery-powered.

The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112a, 112b. In addition, the remote control device 116 may be mounted to another structure (e.g., other than the toggle actuator of the mechanical switch 111), such a as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112a, 112b (e.g., by transmitting messages via the RF signals 106). Such a wall-mounted remote control device may derive power from the AC power source 102.

The remote control device 116 may comprise a user interface having an actuation portion 117 (e.g., a "toggle" button), an intensity adjustment actuator, such as a rotation portion 118 (e.g., a rotary knob), and a visual indicator, such as a status indicator 119. The actuation portion 117 may be actuated (e.g., pushed in towards the mechanical switch 111) and the rotation portion 118 may be rotated (e.g., with respect to the mechanical switch 111). The remote control device 116 may be configured to transmit messages including commands for turning the lighting devices 112a, 112b, 122 on and off in response to actuations (e.g., presses) of the actuation portion 117 and commands for adjusting an intensity level (e.g., a brightness or lighting level) of the lighting devices 112a, 112b, 122 in response to actuations (e.g., rotations) of the rotation portion 118. Though a rotation portion 118 is disclosed, the user interface of the remote control device 116 may include another type of intensity adjustment actuator, such as a linear slider, an elongated touch sensitive actuator, a rocker switch, separate raise/lower actuators, or another form of intensity adjustment actuator.

The lighting devices 112a, 112b may be turned on or off, or the intensity level may be adjusted, in response to the remote control device 116 (e.g., in response to actuations of the actuation portion 117 of the remote control device 116). For example, the lighting devices 112a, 112b may be toggled on or off by a toggle event identified at the remote control device 116. The toggle event may be a user event identified at the remote control device 116. The actuation portion 117 of the remote control device 116 may be actuated to toggle the lighting devices 112a, 112b on or off. The rotation portion 118 of the remote control device 116 may be rotated to adjust the intensity levels of the lighting devices 112a, 112b. The toggle event may be identified when the rotation portion 118 of the remote control device 116 is turned by a predefined amount or for a predefined time, and/or the actuation portion 117 of the remote control device 116 is actuated. The intensity level of the lighting devices 112a, 112b may be increased or decreased by rotating the rotation portion 118 of the remote control device 116 in one direction or another, respectively. Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may provide feedback (e.g., visual feedback) to a user of the remote control device 116 on the status indicator 119. The status indicator 119 may provide different types of feedback. The feedback may include feedback indicating actuations by a user or other user interface event, a status of electrical loads being controlled by the remote control device 116, and/or a status of the load control devices being controlled by the remote control device 116. The feedback may be displayed in response to user interface event and/or in response to messages received that indicate the status of load control devices and/or electrical loads.

The status indicator 119 may be illuminated by one or more light emitting diodes (LEDs) for providing feedback. The status indicator 119 may be a light bar included around the entire perimeter of the remote control device 116, or a portion thereof. The status indicator 119 may also, or alternatively be a light bar in a line on the remote control device 116, such as when the remote control device is a paddle switch or a linear control, for example.

Example types of feedback may include illumination of the entire status indicator 119 (e.g., to different intensity levels), blinking or pulsing one or more LEDs in the status indicator 119, changing the color of one or more LEDs on the status indicator 119, and/or illuminating different sections of one or more LEDs in the status indicator 119 to provide animation (e.g., clockwise and counter clockwise animation for raising and lowering an intensity level). The feedback on the status indicator 119 may indicate a status of an electrical load or a load control device, such as an intensity level for lights (e.g., lighting devices 112a, 112b, 122), a volume level for audio devices, a shade level for a motorized window treatment, and/or a speed for fans or other similar types of devices that operate at different speeds. The feedback on the status indicator 119 may change based on the selection of different presets. For example, a different LED or LEDs may be illuminated on the status indicator 119 to identify different presets (e.g., preset intensity levels for the lighting devices 112a, 112b, 122 and/or other preset configurations for load control devices).

The remote control device 116 may transmit digital messages via the RF signals 106 to control the lighting devices 112a, 112b, 122. The remote control device 116 may be configured to transmit an on command for turning the lighting devices 112a, 112b, 122 on (e.g., an "on" event). For example, the on command may case the lighting devices 112a, 112b, 122 to turn on to a maximum intensity level (e.g., a maximum lighting level, such as 100%), to a predetermined intensity level, and/or to a previous intensity level (e.g., an "on" event). In addition, the remote control device 116 may be configured to transmit an off command for turning the lighting devices 112a, 112b, 122 off (e.g., 0%). Further, the remote control device 116 may be configured to transmit a toggle command for toggling the state of the lighting devices 112a, 112b, 122 (e.g., causing the lighting devices to turn from off to on (e.g., an "on" event, or from on to off (e.g., an "off" event). The intensity level for the "on" event and/or the "off" event may also, or alternatively, be stored at the lighting devices 112a, 112b, 122 and the lighting devices may change to the intensity level upon receiving an indication of the occurrence of the "on" event or "off" event at the remote control device 116. The digital messages may cause an "on" event when the remote control device 116 is rotated a predefined distance or time in one direction. As an example, the remote control device 116 may transmit digital messages when the remote control device 116 is identified as being rotated for 100 milliseconds (ms). The digital messages may indicate an "off" event when the remote control device 116 is rotated a predefined distance or time in the opposite direction. The digital messages may indicate an "on" event or an "off" event when the actuation portion 117 of the remote control device 116 is actuated.

The remote control device 116 may be configured to adjust the intensity levels of the lighting devices 112a, 112b, 122 using absolute control in order to control the intensity levels of the lighting devices 112a, 112b, 122 to an absolute level (e.g., a specific level). For example, the remote control device 116 may transmit digital messages including a move-to-level command (e.g., a go-to-level or go-to command) that identifies an intensity level to which the lighting devices may change. The move-to-level command may include the amount of time over which the intensity level may be changed at the lighting devices. The move-to-level command may cause an "on" event or an "off" event to turn the lighting devices 112a, 112b, 122 on or off, respectively. For example, the "on" event may be caused by a move-to-level command with an intensity level of 100%, or another preset intensity level. The "off" event may be caused by a move-to-level command with an intensity level of 0%.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the intensity level of one or more of the lighting devices 112a, 112b, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may transmit a status query message to the lighting devices 112a, 112b, 122 to query for a current status (e.g., after awakening from sleep mode). The current status of one or more of the lighting devices 112a, 112b, 122 may be used to set the dynamic starting point from which the remote control device 116 may perform control. For example, the remote control device 116 may set the dynamic starting point of the rotation portion 118 to the current intensity level (e.g., on, off, 10%, 20%, etc.) of the first of the lighting devices 112a, 112b, 122 to respond to the status query message, or a predefined lighting device 112a, 112b, 122. Examples of remote control devices configured to transmit status query messages prior to transmitting commands are described in greater detail in commonly-assigned U.S. Pat. No. 10,420,194, issued Sep. 17, 2019, entitled CONTROLLING GROUPS OF ELECTRICAL LOADS, the entire disclosure of which is hereby incorporated by reference.

In another example, the remote control device 116 may set the dynamic starting point of the rotation portion 118 based on the intensity levels of multiple lighting devices 112a, 112b, 122. The remote control device 116 may set the dynamic starting point of the rotation portion 118 to an average intensity level (e.g., on, off, 10%, 20%, etc.) of the lighting devices 112a, 112b, 122, or a common intensity level (e.g., on, off, 10%, 20%, etc.) of a majority of the lighting devices 112a, 112b, 122, for example. The remote control device 116 may set the dynamic starting point of the rotation portion 118 to a maximum intensity level of the lighting devices 112a, 112b, 122 when the rotation portion 118 is being rotated clockwise to raise the intensity level of the lighting devices, or a minimum level of the lighting devices 112a, 112b, 122 when the rotation portion 118 is being rotated counterclockwise to lower the intensity level of the lighting devices, for example. The status indicator 119 may be illuminated as feedback to reflect the dynamic starting point to the user. For example, the remote control device 116 may illuminate a portion of the status indicator 119 that reflects the intensity level that is set as the dynamic starting point.

The remote control device 116 may calculate an increase or decrease in the intensity level from the dynamic starting point based on the user interface event. For example, the remote control device 116 may calculate an increase or decrease in the intensity level based on the distance or amount of time the rotation portion 118 is turned. The rotation from the point of the initial interaction by the user with the rotation portion 118 may be used to identify the increase or decrease in the intensity level from the dynamic starting point. When the remote control device 116 includes a linear control, the remote control device 116 may calculate an increase or decrease in the intensity level based on the distance or amount of time the user swipes a finger up or down on the linear control. The user's finger swipe from the point of the initial interaction by the user with the linear control may be used to identify the increase or decrease in the intensity level from the dynamic starting point.

The updated intensity level may be calculated from the user's initial interaction and stored at the remote control device 116. The updated intensity level may be included in a move-to-level command that is transmitted from the remote control device 116 to the lighting devices 112a, 112b, 122 when the remote control device 116 is using absolute control.

The visual feedback displayed by the status indicator 119 may be provided in or derived from the information in the move-to-level command when the remote control device 116 is using absolute control. For example, the remote control device 116 may reflect the intensity level transmitted in the move-to-level command in the status indicator 119.

The remote control device 116 may transmit digital messages configured to increase the intensity level of the lighting devices 112a, 112b, 122 when the rotation portion 118 is rotated in a direction (e.g., clockwise). As previously mentioned, the remote control device 116 may be configured to adjust the intensity levels of the lighting devices 112a, 112b, 122 to an absolute level using absolute control. In addition, or alternatively, the remote control device 116 may be configured to adjust the intensity levels of the lighting devices 112a, 112b, 122 using relative control to adjust the intensity levels of the light devices 112a, 112b, 122 by a relative amount. For example, the remote control device 116 may transmit digital messages configured to decrease the intensity level of the lighting devices 112a, 112b, 122 when the remote control device 116 is rotated in the opposite direction (e.g., counterclockwise). The digital messages may include a move-with-rate command, which may cause the lighting devices 112a, 112b, 122 to change their respective intensity level by a predefined amount. The move-with-rate command may include an amount of time over which the intensity level may be changed at the lighting devices. The move-with-rate command may cause the lighting devices 112a, 112b, 122 to retain their relative or proportional intensity levels, and/or difference in respective intensity levels. The remote control device 116 may send digital messages to increase or decrease the intensity level by a predefined amount when rotated a predefined distance or for a predefined time. The amount of the increase or decrease may be indicated in the digital messages or may be predefined at the lighting devices 112a, 112b, 122. The digital messages may also include a move-to-level-over-time command, which may include both an intensity level to which to control the lighting devices 112a, 112b, 122 and an amount of time over which the intensity level may be changed at the lighting devices.

The remote control device 116 may transmit digital messages that include move-with-rate commands to increase or decrease the intensity level of the lighting devices 112a, 112b, 122 in predefined increments as the user turns the remote control device 116 a predefined distance or time in one direction or another. The remote control device 116 may continue to transmit digital messages to the lighting devices 112a, 112b, 122 as the user continues to turn the remote control device 116. For example, the remote control device 116 may identify a rotation of a predefined distance or for a predefined time and send one or more digital messages to instruct the lighting devices 112a, 112b, 122 to each increase by ten percent (10%). The remote control device 116 may identify a continued rotation of a predefined distance or time and send digital messages to instruct the lighting devices 112a, 112b, 122 to increase by ten percent (10%) again.

The remote control device 116 may also, or alternatively, send digital messages for a direct command (e.g., "on" command, "off" command, toggle command, etc.) to turn on/off the lighting devices 112a, 112b, 122. The remote control device 116 may transmit one or more digital messages to the lighting devices 112a, 112b, 122 when an on event or an off event are detected. For example, the remote control device 116 may identify a rotation or actuation and send digital messages to instruct the lighting devices 112a, 112b, 122 to turn on and/or off. The remote control device 116 may operate by sending a move-with-rate command after turning on. For example, the remote control device 116 may identify a rotation of a predefined distance or time after turning on and send digital messages to instruct the lighting devices 112a, 112b, 122 to increase and/or decrease their intensity levels by a predefined intensity level (e.g., approximately 10%).

The remote control device 116 may transmit the digital messages as multicast messages and/or unicast messages via the RF signal 106. For example, the digital messages including the move-with-rate command or the move-to-level command may be transmitted as unicast messages. Unicast messages may be sent from the remote control device 116 directly or via hops to each of the lighting devices 112a, 112b, 122. Also, or alternatively, unicast messages may be sent from the remote control device 116 to each of the lighting devices 112a, 112b, 122 via one or more hops (e.g., intermediary devices in the load control system that may retransmit the message to another control device for retransmission and/or to one of the respective lighting devices 112a, 112b, 122). The remote control device 116 may individually send a unicast message to each of the lighting devices 112a, 112b, 122 with which the remote control device 116 is associated for performing load control. The remote control device 116 may have the unique identifier of each of the lighting devices 112a, 112b, 122 with which it is associated stored in memory. The remote control device 116 may generate a separate unicast message for each lighting device 112a, 112b, 122 and address the unicast messages to the lighting devices 112a, 112b, 122 independently. The unicast messages may also include the unique identifier of the remote control device 116. The lighting devices 112a, 112b, 122 may identify the unicast messages communicated to them by identifying their own unique identifier and/or a corresponding identifier of the remote that are stored in an association dataset. The lighting devices 112a, 112b, 122 may operate according to the instructions (e.g., load control instructions) in the digital messages comprising their own unique identifier and/or the unique identifier of an associated device, such as the remote control device 116. For example, when using some RF communication protocols (e.g., such as, ZIGBEE and THREAD), the lighting devices 112a, 112b, 122 may each transmit an acknowledgement message to the remote control device 116 in response to receiving a unicast message from the remote control device. However, for other RF communication protocols (e.g., such as, BLUETOOTH), the lighting devices 112a, 112b, 122 may not transmit acknowledgement messages to the remote control device 116 in response to receiving unicast messages from the remote control device.

The digital messages may be transmitted via the RF signals 106 as multicast messages. For example, the digital messages including a direct command (e.g., an on command, an off command, and/or a toggle command) and/or a move-to-level command that causes an "on" event or an "off" event may be transmitted as multicast messages. In addition, the digital messages including the move-to-level command that causes the lighting devices 112a, 112b, 122 to adjust their intensities by a large amount (e.g., larger than a threshold) may be transmitted as multicast messages. The multicast messages may be communicated efficiently from the remote control device 116 as a single message may be transmitted to multiple lighting devices, such as lighting devices 112a, 112b, 122, at once. The load control instructions in the multicast messages may be received and implemented by multiple lighting devices, such as lighting devices 112a, 112b, 122, at the same time, or at nearly the same time with a minor delay due to differences in latency, as a single message is being received at a group of devices within the same wireless range. For example, the lighting devices 112a, 112b, 122 may not transmit acknowledgement messages to the remote control device 116 in response to receiving multicast messages from the remote control device.

The multicast messages may include a group identifier for controlling the lighting devices 112a, 112b, 122 that are a part of the multicast group. The lighting devices 112a, 112b, 122 may be a part of the multicast group when they are associated with the group identifier (e.g., by having the group identifier stored thereon) for recognizing multicast messages transmitted to the group. The lighting devices 112a, 112b, 122 that are associated with the group identifier may recognize the multicast messages and control the corresponding lighting load according to the command in the multicast messages. The lighting devices 112a, 112b, 122 may forward the multicast messages with the group identifier for identification and load control by other lighting devices associated with the group identifier. The group may be formed at commissioning or configuration of the load control system 100. The remote control device 116 may generate the group identifier and send the group identifier to the lighting devices 112a, 112b, 122 and/or a system controller (e.g., a hub device) when the remote control device 116 is in an association mode (e.g., entered upon selection of one or more buttons). The devices that store the group identifier may be part of the group of devices that are associated with the remote control device 116 and can respond to group messages.

Embodiments described herein are not limited to remote control devices, but other controller devices may also be used in the same, or similar, manner. For example, embodiments may include wired control devices and/or plug-in control devices that communicate digital messages as described herein.

FIG. 1B shows an example of the load control system 100 having other devices. For example, the load control system 100 may include other control devices, such as controller devices and/or load control devices. The load control devices may be capable of controlling the amount of power provided to a respective electrical load based on digital messages received from the controller devices, which may be input devices. The digital messages may include load control instructions or another indication that causes the load control device to determine load control instructions for controlling an electrical load.

Examples of load control devices may include a motorized window treatment 130 and/or the lighting devices 112a, 112b, 122, though other load control devices may be implemented. The controller devices may include a h, though other controller devices may be implemented. The controller devices may perform communications in a configuration similar to the remote control device 116 as described herein. The load control devices may perform communications in a configuration similar to the lighting devices 112a, 112b, 122 as described herein.

The load control devices may receive digital messages via wireless signals, e.g., radio-frequency (RF) signals 106. The wireless signals may be transmitted by the controller devices. In response to the received digital messages, the respective lighting devices 112a, 112b, 122 may be turned on and off, and/or the intensities of the respective lighting devices 112a, 112b, 122 may be increased or decreased. In response to the received digital messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. The battery-powered remote control device 150 may be a wireless device capable of controlling a load control device via wireless communications. Examples of remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 8,471,779, issued Jun. 25, 2013, entitled WIRELESS BATTERY-POWERED REMOTE CONTROL WITH LABEL SERVING AS ANTENNA ELEMENT, the entire disclosures of which are hereby incorporated by reference.

The occupancy sensor 160 may be configured to detect occupancy and/or vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING, the entire disclosure of which is hereby incorporated by reference.

The daylight sensor 170 may be configured to measure a total light level in the space in which the load control system 100 is installed. The daylight sensor 170 may transmit digital messages including the measured light level via the RF communication signals 106 for controlling load control devices in response to the measured light level. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Digital messages transmitted by the controller devices may include a command and/or identifying information, such as a serial number (e.g., a unique identifier) associated with the transmitting controller device. Each of the controller devices may be associated with the lighting devices 112*a*, 112*b*, 122 and/or the motorized window treatment 130 during a configuration procedure of the load control system 100, such that the lighting devices 112*a*, 112*b*, 122 and/or the motorized window treatment 130 may be responsive to digital messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a system controller 180 (e.g., a hub device or a system bridge) configured to enable communication with a network 182, e.g., a wireless or wired local area network (LAN). For example, the system controller 180 may be connected to a network router (not shown) via a wired digital communication link 184 (e.g., an Ethernet communication link). The network router may allow for communication with the network 182, e.g., for access to the Internet. The system controller 180 may be wirelessly connected to the network 182, e.g., using wireless technology, such as WI-FI® technology, cellular technology, etc. The system controller 180 may be configured to transmit communication signals (e.g., RF signals 106) to the lighting devices 112*a*, 112*b*, 122 and/or the motorized window treatment 130 for controlling the devices in response to digital messages received from external devices via the network 182. The system controller 180 may be configured to transmit and/or receive the RF signals 106. The system controller 180 may be configured to transmit digital messages via the network 182 for providing data (e.g., status information) to external devices.

The system controller 180 may operate as a central controller for the load control system 100, and/or relay digital messages between the control devices (e.g., lighting devices, motorized window treatments, etc.) of the load control system and the network 182. The system controller 180 may receive digital messages from a controller device and configure the digital message for communication to a load control device. For example, the system controller 180 may configure multicast messages and/or unicast messages for transmission as described herein. The system controller 180 may be on-site at the load control system 100 or at a remote location. Though the system controller 180 is shown as a single device, the load control system 100 may include multiple hubs and/or the functionality thereof may be distributed across multiple devices.

The load control system 100 may include a network device 190, such as, a smart phone, a personal computer, a laptop, a wireless-capable media device (e.g., a media player, gaming device, or television), a tablet device, (e.g., a hand-held computing device), a wireless-communication-capable television, or any other suitable network communication or Internet-Protocol-enabled device. The network device 190 may be operable to transmit digital messages in one or more Internet Protocol packets to the system controller 180 via RF signals 108, either directly or via the network 182. The RF signals 108 may be communicated using a different protocol and/or wireless band than the RF signals 106. In another example, the RF signals 108 and the RF signals 106 may be the same. Examples of load control systems operable to communicate with network devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the system controller 180 through the wireless communications described herein.

The operation of the load control system 100 may be programmed and configured using the system controller 180 and/or network device 190. An example of a configuration procedure for a wireless load control system is described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The lighting devices 112a, 112b, 122 may each be included in a group of lighting devices that are associated with a common control device, such as the remote control device 116. For example, each of the lighting devices 112a, 112b, 122 may store the unique identifier of the remote control device 116 during an association mode to enable the lighting devices 112a, 112b, 122 to be controlled by digital messages from the remote control device 116 that include control instructions. The system controller 180 may store the associations between each of the lighting devices 112a, 112b, 122 and the remote control device 116 during an association mode. The association information may be used by the system controller 180 for routing digital messages to the lighting devices 112a, 112b, 122, or the lighting devices 112a, 112b, 122 may receive digital messages from the remote control device 116 directly.

The remote control device 116 may be configured to transmit messages to the lighting devices 112a, 112b, 122 via the system controller 180. For example, the remote control device 116 may be configured to transmit unicast messages to the system controller 180. The system controller 180 may be configured to transmit an acknowledgement message to the remote control device 116 in response to receiving a unicast message from the remote control device. The system controller 180 may be configured to transmit unicast and/or multicast messages to the lighting devices 112a, 112b, 122 for controlling the lighting devices in response to the unicast message received from the remote control device 116. For example, the remote control device 116 may send transmit a message including a toggle command or an on/off command (e.g., an "on" command or an "off" command) for controlling the lighting devices 112a, 112b, 122 to toggle the lighting devices 112a, 112b, 122 from an "on" state to an "off" state, or vice versa. The remote control device 116 may transmit a unicast message including the toggle command or the on/off command to the system controller 180, which may transmit a multicast message that is received at each of the lighting devices 112a, 112b, 122 In addition, the remote control device 116 may transmit a unicast message including a move-to-level command or a move-with-rate command to the system controller 180, which may transmit unicast messages that are independently directed to each of the lighting devices 112a, 112b, 122.

The remote control device 116 may use the intensity level of a lighting device as a starting point (e.g., a dynamic starting point) upon which dimming is performed for the group of lighting devices 112a, 112b, 122. For example, in response to the status query message from the remote control device 116, the lighting device 112a may respond by transmitting a status response message indicating that the lighting device 112 is at an intensity level of 10%. The remote control device 116 may set the intensity level identified by the lighting device 122 as the dynamic starting point upon which control of the intensity levels for the group of lighting devices 112a, 112b, 122 may be performed. The remote control device 116 may identify a continued rotation for increasing the intensity level by an additional 20%. The remote control device 116 may add this 20% to the dynamic starting point of 10% that was indicated as the current intensity level of the lighting device 112a that responded to the previous status query message from the remote control device 116. The remote control device 116 may send a digital message to the group of lighting devices 112a, 112b, 122 to control the group of lighting devices 112a, 112b, 122 to an absolute intensity level of 30%. The digital message may include a go-to-level command that is configured to control each of the lighting devices 112a, 112b, 122 to an intensity level of 30%. Each of the lighting devices 112a, 112b, 122 may receive the digital message (e.g., as a unicast message or a multicast message) and be controlled to the absolute intensity level of 30%, unless the lighting device is already at the indicated intensity level. When the group of lighting devices 112a, 112b, 122 are in the same state, the group of lighting devices 112a, 112b, 122 may be controlled as a group. For example, the group of lighting devices 112a, 112b, 122 may be controlled together from 10% to 30%. When the state of the group of lighting devices 112a, 112b, 122 is out of sync, the lighting devices 112a, 112b, 122 may be controlled differently to reach the indicated intensity level. For example, the lighting devices 112a, 112b, 122 that are above the indicated intensity level may decrease the intensity level to meet the indicated intensity level. The lighting devices 112a, 112b, 122 that are below the indicated intensity level may increase in the intensity level to meet the indicated intensity level. The lighting devices 112a, 112b, 122 that are already in the state indicated in the digital message may go unchanged in response to the digital message from the remote control device 116.

The lighting devices 112a, 112b, 122 may fade from one intensity level to another intensity level (e.g., be dimmed between intensity levels over a fade time and/or at a fade rate) in response to receiving a command. For example, the lighting devices 112a, 112b, 122 may be dimmed at a rate or over a period of time such that each of the lighting devices 112a, 112b, 122 that is not already at the indicated intensity level reaches the intensity level at the same time. For example, the remote control device 116 may send the go-to-level command with an amount of time or fade rate over which the lighting devices 112a, 112b, 122 are to be dimmed until the lighting devices 112a, 112b, 122 reach the indicated intensity level (e.g., different fade rates or fade times may be transmitted to each of the lighting devices 112a, 112b, 122). The lighting devices 112a, 112b, 122 may be dimmed over the indicated period of time to the intensity level indicated in the go-to-level command. When one or more of the lighting devices 112a, 112b, 122 are at different intensity levels, the lighting devices 112a, 112b, 122 may be sent unicast messages with different fade rates such that the lighting devices 112a, 112b, 122 at different intensity levels reach the intensity level indicated in the go-to-level command at the same time. The fade time may vary in a predetermined amount for each level the intensity level may be increased or decreased.

The system controller 180 may operate as a parent device (e.g., a master device) that may be configured to monitor the state of child devices (e.g., slave devices), such as lighting devices 112a, 112b, 122, and determine the appropriate command to be transmitted in response to a user interface event based on the state of the slave devices. Though the system controller 180 may be described herein as being a master device for controlling a group of lighting devices, other control devices (e.g., one of the lighting devices 112a, 112b, 122, remote control device 150, occupancy sensor 160, daylight sensor 170, network device 190, motorized window treatment 132, a remote computing device, etc.) may be assigned as a master device that operates as described herein for the system controller 180. When a lighting device 112a, 112b, 122 is assigned as the master device, the lighting device 112a, 112b, 122 may already know its own state, but may monitor the state of other slave devices. Though other devices may operate as the master device, they may still communicate via the system controller 180.

The system controller 180 may keep track of the on/off state of each of the lighting devices 112a, 112b, 122 after being implemented in the load control system 100. Upon initial implementation into the load control system, the system controller 180 may transmit a status query message to the lighting devices 112a, 112b, 122 to query for their current on/off state. The status query message may be sent as a multicast message, or individual unicast messages, to each of the lighting devices 112a, 112b, 122. The lighting devices 112a, 112b, 122 may return the current on/off state, which may be stored locally thereon. The system controller 180 may identify commands communicated to the lighting devices 112a, 112b, 122 and maintain the current on/off state of the lighting devices 112a, 112b, 122 in memory. The digital messages that are communicated to the lighting devices 112a, 112b, 122 for controlling the on/off state may be monitored to determine the current on/off state, without sending an initial status query message. The system controller 180 may be powered and/or awake at all times (e.g., at all times than the lighting devices 112a, 112b, 122 are also powered), such that the system controller 180 is able to monitor the states of the lighting devices by listening to the messages transmitted by the lighting devices. In addition, the system controller 180 may enter a sleep mode and periodically wake up to transmit status query messages to the lighting devices 112a, 112b, 122 to determine the on/off states of the lighting devices.

When the system controller 180 receives an indication of a toggle event from the remote control device 116, the system controller 180 may choose the command to send, or whether to send a command, to the lighting devices 112a, 112b, 122. The decision at the system controller 180 may be based on the current on/off state of the lighting devices 112a, 112b, 122. The system controller 180 may identify whether the on/off state across the group of lighting devices 112a, 112b, 122 is consistent. If the on/off state across the group of lighting devices 112a, 112b, 122 is consistent, the system controller 180 may send the toggle command, or an "on" command or "off" command, to the lighting devices 112a, 112b, 122 to toggle the on/off state of the group of lighting devices 112a, 112b, 122.

The lighting devices 112a, 112b, 122 that change an on/off state in response to an "on" command or an "off" command may send a state update message to the system controller 180 to indicate the change in on/off state. The system controller 180 may receive the state update message from the lighting devices 112a, 112b, 122 that change state in response to the received "on" command or the received "off" command. The lighting devices that fail to change the on/off state in response to the command from the system controller 180 may be unresponsive. For example, the system controller 180 may send an "off" command to the lighting devices 112a, 112b, 122 and the lighting device 122 may update the on/off state to the "off" state. The lighting device 122 may send a response message to the system controller 180 to indicate the change in state. The system controller 180 may store the updated state and/or confirm the state of the unresponsive devices. The system controller 180 may, alternatively, store the updated state of the lighting device 122 after sending the command. As the system controller 180 may be maintaining the on/off state of the lighting devices 112a, 112b, 122, the remote control device 116 may go to sleep after transmitting a message in response to the toggle event.

Figure 2A:
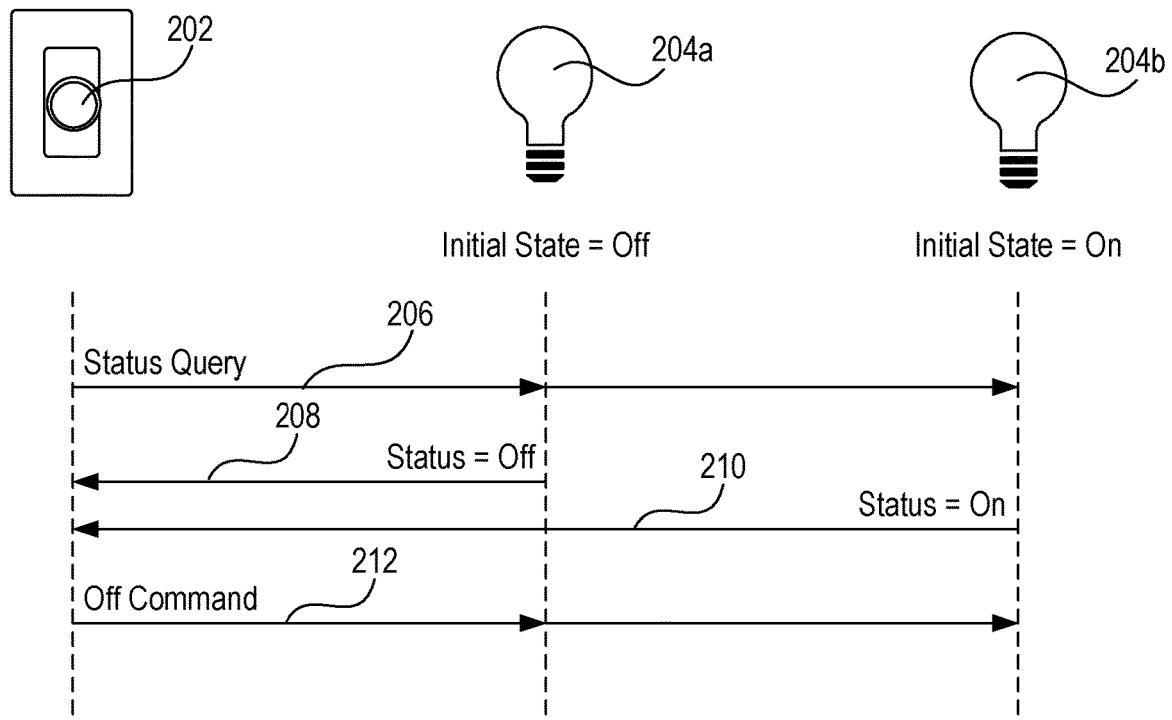
FIGS. 2A-2C are sequence diagrams depicting example message flows for querying for a current status of lighting devices and generating lighting control commands in response to the identified status.
Figure 2B:
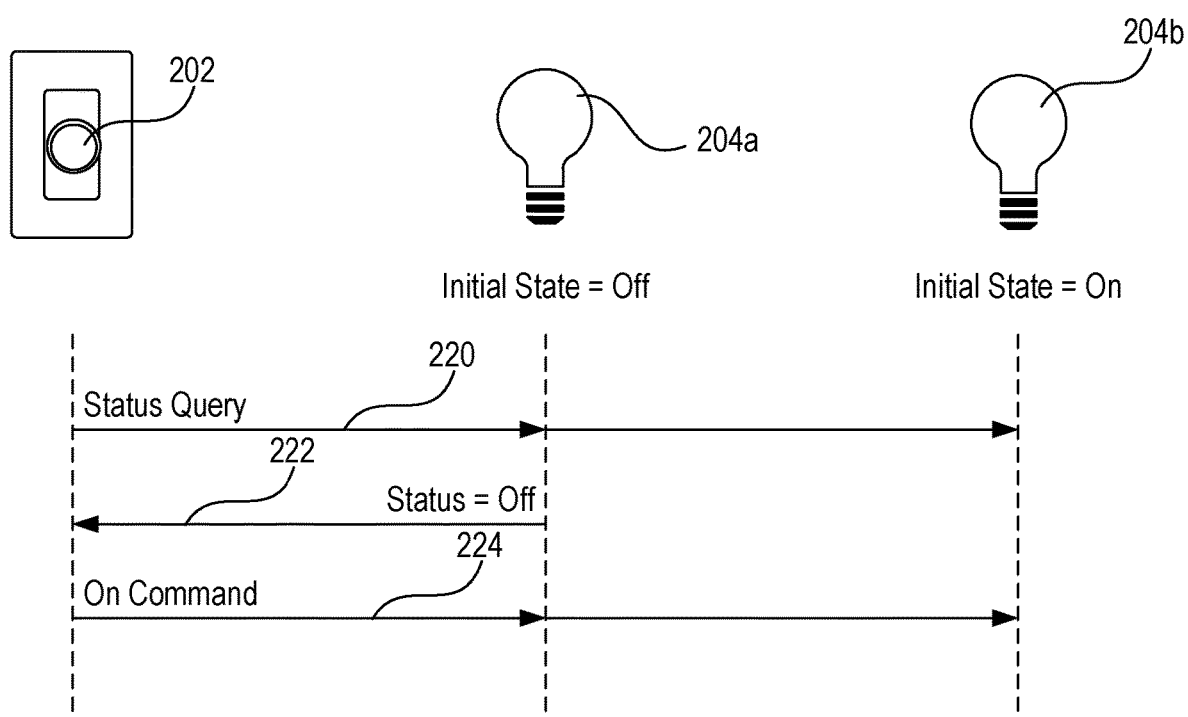
Figure 2C:
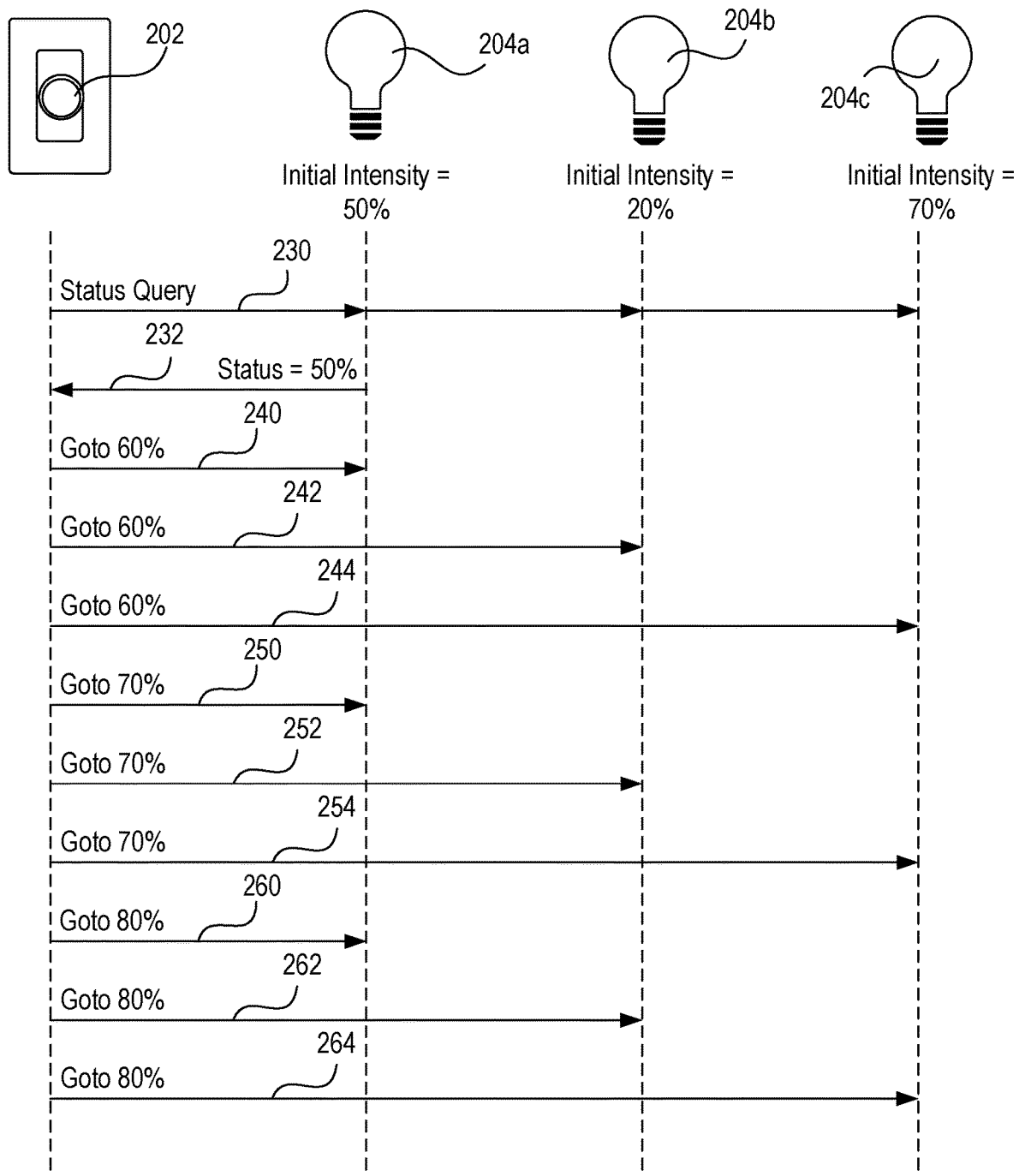

FIGS. 2A-2C are sequence diagrams depicting example message flows for generating lighting control commands in response to an actuation of an actuator (e.g., the actuation portion 117 and/or the rotation portion 118 of the remote control device 116). FIGS. 2A and 2B depict example message flows for querying for a current status of lighting devices in response to an actuation of a toggle actuator (e.g., the actuation portion 117) and generating lighting control commands in response to the identified status. As shown in FIG. 2A, a remote control device 202 may transmit a status query message 206 for identifying the status of lighting devices, such as lighting devices 204a, 204b (e.g., the lighting devices 112a, 112b, 122). The status query message 206 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 206 may be sent as a multicast message (e.g., as shown in FIG. 2A) or individual unicast messages that are received by the lighting devices 204a, 204b.

The remote control device 202 may receive a response to the status query message 206 from each of the lighting devices 204a, 204b that receive the status query message 206 and/or with which the remote control device 202 is associated. For example, the lighting device 204a may transmit a status response message 208 in response to the status query message 206 that indicates that the lighting device 204a is in the off state. The lighting device 204b may transmit a status response message 210 in response to the status query message 206 that indicates that the lighting device 204b is in the on state. The status response messages may also, or alternatively, indicate an intensity level (e.g., a brightness or intensity level), a color (e.g., a color temperature), or other status of the lighting device from which the status message is transmitted.

If the remote control device 202 determines that any of the lighting devices 204a, 204b are in the on state, the remote control device 202 may be configured to transmit a default toggle command, such as the off command 212. The off command 212 may be sent as a multicast message (e.g., as shown in FIG. 2A) or individual unicast messages that are received by the lighting devices 204a, 204b. Though an off command 212 may be transmitted as the default toggle command as shown in FIG. 2A, the remote control device 202 may transmit an on command or another default command in response to identifying a status of one or more of the lighting devices 204a, 204b. The lighting device 204b may turn to the off state in response to receiving the off command 212.

The remote control device 202 may determine the control instructions for being sent to the lighting devices 204a, 204b based on the status of one of the lighting devices 204a, 204b. For example, the remote control device 202 may determine the control instructions for being sent to the lighting devices 204a, 204b based on the status of a master lighting device or a lighting device that is first to respond to the status query message 206. The remote control device 202 may control the state of both of the lighting devices, 204a, 204b to respond to the status query message by sending a command to toggle the lighting devices, or may toggle the other lighting devices in order to synchronize the other devices with the state of the master lighting device or the first lighting device to respond.

As shown in FIG. 2B, the remote control device 202 may respond to the status of the first lighting device 204a, 204b to respond to a status query message. For example, a status query message 220 may be sent as a multicast message (e.g., as shown in FIG. 2B) or a unicast message to each lighting device 204a, 204b. The lighting device 204a may be the first device to receive the status query message 220 and/or from which a status response message 222 is received in response. The status response message 222 may indicate the status of the lighting device 204a, which may cause the remote control device 202 to send the opposite command (e.g., an on command 224). The on command 224 may be sent as a multicast message (e.g., as shown in FIG. 2B) or a unicast message. While not shown in FIG. 2B, the lighting device 204b may be the first device to receive the status query message 220 and/or from which a status response message is received in response. The status response message may indicate the status of the lighting device 204b, which may cause the remote control device 202 to send the opposite command (e.g., the off command 234). The off command 234 may be sent as a multicast message or a unicast message.

Though not shown in FIG. 2B, the remote control device 202 may scan for lighting devices 204a, 204b in a preferred state (e.g., an on/off state, an intensity level, a color, etc.). The remote control device 202 may send the status query message as a unicast message to each of the lighting devices 204a, 204b or as a multicast message to both lighting devices 204a, 204b. The remote control device 202 may continue to send a status query message to each of the lighting devices 204a, 204b until one of the lighting devices returns a non-preferred state. For example, remote control device 202 may send the status query message 206 to the lighting device 204a and receive the status response message 208 prior to sending a status query message to the lighting device 204. The remote control device 202 may stop scanning for lighting devices when the remote control device 202 receives a status message from a lighting device that identifies the lighting device as being in a non-preferred state (e.g., state other than the preferred on/off state, intensity level, color, etc.), or when the remote control device 202 has scanned each lighting device.

The remote control device 202 may transmit a status query message that requests a response from lighting devices in a particular state. For example, as shown in FIG. 2B, the remote control device 202 may transmit the status query message 220 that requests a response from lighting devices in the off state. The status query message 220 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 220 may be a multicast message (e.g., as shown in FIG. 2B) or individual unicast messages by the lighting devices 204a, 204b with which the remote control device 202 may be associated.

As the lighting device 204a is in the off state, the lighting device 204a may respond with the status response message 222 that indicates that the lighting device 204a is in the off state. The status response message 222 may indicate that the lighting device 204a is in the off state, or the transmission of the status response message 222 itself may indicate that the lighting device 204a is in the off state. As the lighting device 204b is in the on state, the lighting device 204b may be unresponsive to the status query message 220.

The remote control device 202 may receive a response to the status query message 220 from the lighting device 204a and determine that at least one lighting device is in the off state. If the remote control device 202 determines that any of the lighting devices 204a, 204b are in the off state, the remote control device 202 may be configured to transmit a default toggle message, such as the on command 224. The on command 224 may be sent as a multicast message or individual unicast messages that are received by the lighting devices 204a, 204b.

FIG. 2C depicts an example message flow for querying for a current status (e.g., intensity levels) of lighting devices in response to an actuation of an intensity adjustment actuator (e.g., the rotation portion 118) and generating lighting control commands in response to the identified status. As shown in FIG. 2C, the remote control device 202 may transmit a status query message 230 for identifying the intensity level of lighting devices, such as lighting devices 204a, 204b, 204c, which may each be at differing intensity levels (as shown). The status query message 230 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 230 may be sent as a multicast message (e.g., as shown in FIG. 2C) or individual unicast messages that are received by the lighting devices 204a, 204b, 204c.

The remote control device 202 may determine the control instructions for being sent to the lighting devices 204a, 204b, 204c based on the status of one of the lighting devices 204a, 204b, 204c. For example, the remote control device 202 may determine the control instructions for being sent to the lighting devices 204a, 204b, 240c based on the status (e.g., an intensity level) of a first lighting device to respond to the status query message 230 (e.g., lighting device 204a as shown in FIG. 2C). The remote control device 202 may control the intensity levels of all of the lighting devices 204a, 204b, 204c by sending a command to go to an updated intensity level that may be determined based on the intensity level of the first lighting device to respond to the status query message 206. For example, the lighting device 204a may transmit a status response message 232 that may indicate that the lighting device 204a is at an intensity level of 50%.

The remote control device 202 may use the intensity level of the first lighting device 204a, 204b, 204c to respond to the status query message 230 to control the lighting devices 204a, 204b, 204c. In response to receiving the status response message 232 indicating that the lighting device 204a is at the intensity level of 50%, the remote control device 202 may transmit a command message 240 including a move-to-level command (e.g., a go-to command) to go to an updated intensity level $L_{NEW}$ of 60% to the lighting device 204a. The remote control device 202 may then transmit a command message 242 to the lighting device 204b and a command message 244 to the lighting device 204c, where each of the command messages 242, 244 including the same move-to-level command as included in the command message 240 (e.g., to go to the updated intensity level $L_{NEW}$ of 60%). The command messages 240, 242, 244 may be transmitted as unicast messages (e.g., as shown in FIG. 2C) or a multicast message. The remote control device 202 may be configured to determine a desired amount of change in the intensity level of the lighting devices 204a, 204b, 204c in response to an amount of rotation of the rotation portion (e.g., a change in an angular position of the rotation portion) since the rotation of the rotation portion first began until the command message 240 is transmitted, and to determine the updated intensity level $L_{NEW}$ to which to control the lighting devices 204a, 204b, 204c in response to the desired amount of change in the intensity level.

The remote control device 202 may continue to transmit command messages to the lighting devices 204a, 204b, 204c as the rotation portion is rotated. For example, the remote control device 202 may transmit command messages 250, 252, 254 to the respective lighting devices 204a, 204b, 204c, where the command messages each include a move-to-level command to go to an updated intensity level $L_{NEW}$ of 70%. The command messages 250, 252, 254 may be transmitted as unicast messages (e.g., as shown in FIG. 2C) or a multicast message. The remote control device 202 may be configured to determine the updated intensity level $L_{NEW}$ to which to control the lighting devices 204a, 204b, 204c in response to an amount of rotation of the rotation portion since the command message 240 was transmitted until the command message 250 is transmitted.

The remote control device may then transmit command messages 260, 262, 264 to the respective lighting devices 204a, 204b, 204c, where the command messages each include a move-to-level command to go to an updated intensity level $L_{NEW}$ of 80%. The command messages 260, 262, 264 may be transmitted as unicast messages (e.g., as shown in FIG. 2C) or a multicast message. The remote control device 202 may be configured to determine the updated intensity level $L_{NEW}$ to which to control the lighting devices 204a, 204b, 204c in response to an amount of rotation of the rotation portion since the command message 250 was transmitted until the command message 260 is transmitted.

Figure 3A:
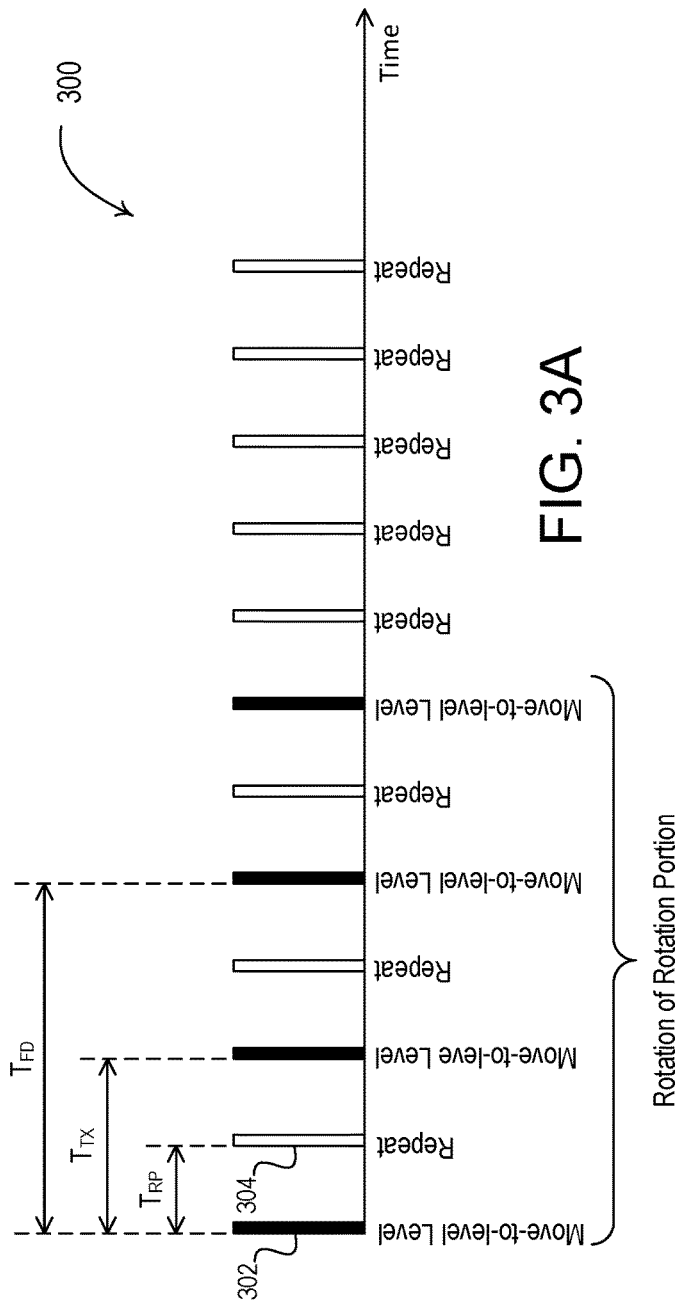
FIG. 3A is a timing diagram depicting an example of controlling lighting devices in a load control system using move-to-level commands.
Figure 3B:
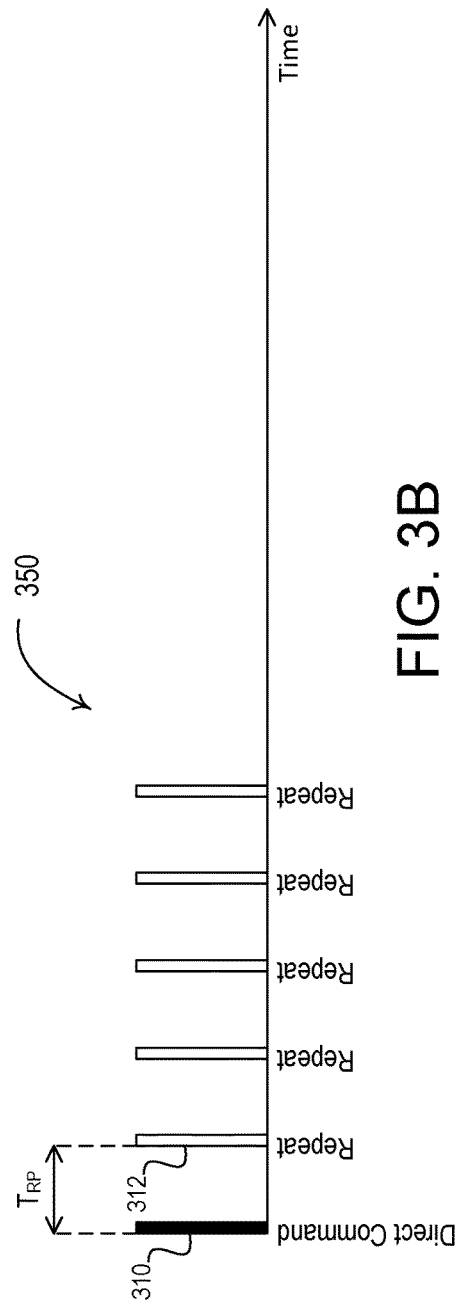
FIG. 3B is a timing diagram depicting an example of controlling lighting devices in a load control system using direct commands.

FIGS. 3A and 3B are timing diagrams that depict examples of controlling (e.g., adjusting intensities of) lighting devices in a load control system. FIG. 3A is a timing diagram depicting an example of a command message event 300 for controlling lighting devices using move-to-level commands (e.g., go-to-level or go-to commands). As illustrated in FIG. 3A, a move-to-level command message may be transmitted in response to rotation of a rotation portion (e.g., the rotation portion 118 of the remote control device 116 shown in FIGS. 1A and 1B). The move-to-level command message 302 may be transmitted periodically (e.g., as indicated by the filled transmission blocks in FIG. 3A). For example, the move-to-level command message 302 may be transmitted periodically at a transmission interval $T_{TX}$ (e.g., a transmission period) while the rotation portion of the remote control device is being rotated. For example, the transmission interval $T_{TX}$ may be a time of approximately 100 milliseconds.

A repeat command message 304 (e.g., indicated by non-filled transmission blocks in FIG. 3A) of the move-to-level command message transmitted at 302 may be transmitted. The repeat command messages 304 may be transmitted periodically. For example, the repeat command messages 304 may be transmitted periodically at a repeat interval $T_{RP}$ relative to a previous move-to-level command message 302 (e.g., at the end of the repeat interval $T_{RP}$ from the beginning of the transmission interval $T_{TX}$ of the immediately-preceding move-to-level command message). Since the repeat command messages 304 may be transmitted at the repeat interval $T_{RP}$ from the beginning of the transmission interval $T_{TX}$, the repeat command messages 304 may also be transmitted periodically at the transmission interval $T_{TX}$ while the rotation portion is being rotated. As illustrated in FIG. 3A, the repeat command message 304 may include a repeat of the previous move-to-level command message 302. The repeat interval $T_{RP}$ may be a period of time less than (e.g., 50% less than) the transmission interval $T_{TX}$ (e.g., the repeat interval $T_{RP}$ may be half of the transmission interval $T_{TX}$). For example, the transmission interval $T_{TX}$ may be a first period of time (e.g., 100 milliseconds) and the repeat interval $T_{RP}$ may be a second period of time (e.g., 50 milliseconds). The transmission of repeat command messages 304 may provide an increased probability that command messages are received by the lighting devices and/or that the intensity levels of the lighting devices do not differ much from each other as the intensity levels are being adjusted in response to the rotation portion.

As described herein, the move-to-level command messages 302 and the repeat command messages 304 may include an updated intensity level $L_{NEW}$ (e.g., an updated lighting level) and a fade period $T_{FD}$. The fade period $T_{FD}$ may be the amount of time over which the intensity level is to be changed to the updated intensity level $L_{NEW}$ by the lighting devices. As described herein, the fade period $T_{FD}$ may include a period of time that is longer than the transmission interval $T_{TX}$. For example, the fade period $T_{FD}$ may be approximately 200 milliseconds. When the fade period $T_{FD}$ includes a period of time that is longer than the transmission interval $T_{TX}$, a lighting device will not stop changing its respective intensity level in response to a previous command message before a subsequent command message is received. Further, if a lighting device fails to receive a move-to-level command message 302, the lighting device may receive the repeat command message 304 (e.g., following that move-to-level command message) during the fade period (e.g., while the lighting device is still transitioning to the updated intensity level $L_{NEW}$), which may provide an unnoticeable effect on the change in the intensity levels at the lighting devices (e.g., to minimize the difference between the intensity levels of the lighting devices). For example, as the repeat interval $T_{RP}$ is shorter than the transmission interval $T_{TX}$ and the fade period $T_{FD}$, repeat command message 304 may be received within a shorter period of time relative to the transmission of a subsequent move-to-level command message 302 and the fade period $T_{FD}$). In addition, the repeat command message 304 may allow to lighting devices to "catch up" and change its intensity level accordingly over the fade period $T_{FD}$.

As illustrated in FIG. 3A, the move-to-level command messages 302 (e.g., indicated by the filled-in transmission blocks) and the repeat command messages 304 (e.g., indicated by the un-filled transmission blocks) may be transmitted while the rotation portion is being rotated. After rotation of the rotation portion has stopped, the remote control device may transmit a number of repeat command messages 304. For example, as illustrated in FIG. 3A, the remote control device may transmit 5 repeat command messages 304 after detecting that the rotation portion has stopped rotating (e.g., stopped rotation in the clockwise or counter-clockwise direction). The remote control device may detect that the rotation portion has stopped rotating when a period of time since a rotation of the rotation portion was last detected exceeds a threshold time period. As described herein, the repeat command message 304 transmitted after rotation has stopped may each include the move-to-level command message 302 transmitted last (e.g., the last filled-in transmission block in FIG. 3A). The number of repeats may provide an increased probability that the last move-to-level command message is received by the lighting devices. For example, if the lighting device fails to receive the move-to-level command messages 302, the lighting device may receive one of the repeat command messages 304, which may ensure that all of the lighting devices end up at the same intensity level (e.g., as indicated in the last move-to-level command message).

FIG. 3B is a timing diagram depicting an example of a command message event 350 for controlling lighting devices using direct commands (e.g., a "toggle" command, an "on" command, or an "off" command). As illustrated in FIG. 3B, a direct command message 310 may be transmitted in response to an actuation of an actuation portion (e.g., the actuation portion 117 of the remote control device 116 shown in FIGS. 1A and 1B). The direct command message 310 may include a direct command (e.g., a "toggle" command, an "on" command, or an "off" command). After the direct command message 310 is transmitted, a number of repeat command messages 312 of the direct command message 310 may be transmitted. As illustrated in FIG. 3B, the repeat command messages 312 (e.g., indicated by the un-filled transmission blocks in FIG. 3B) may be transmitted periodically at the repeat interval $T_{RP}$ (e.g., at a rate of ever $T_{RP}$). As described herein, the repeat command message 312 may include the direct command of the direct command message 310. The repeat command messages 312 may provide an increased probability that the direct command messages are received by the lighting devices. For example, if the lighting device fails to receive the direct command messages 310, the lighting device may receive one of the repeat command messages 312.

Figure 4:
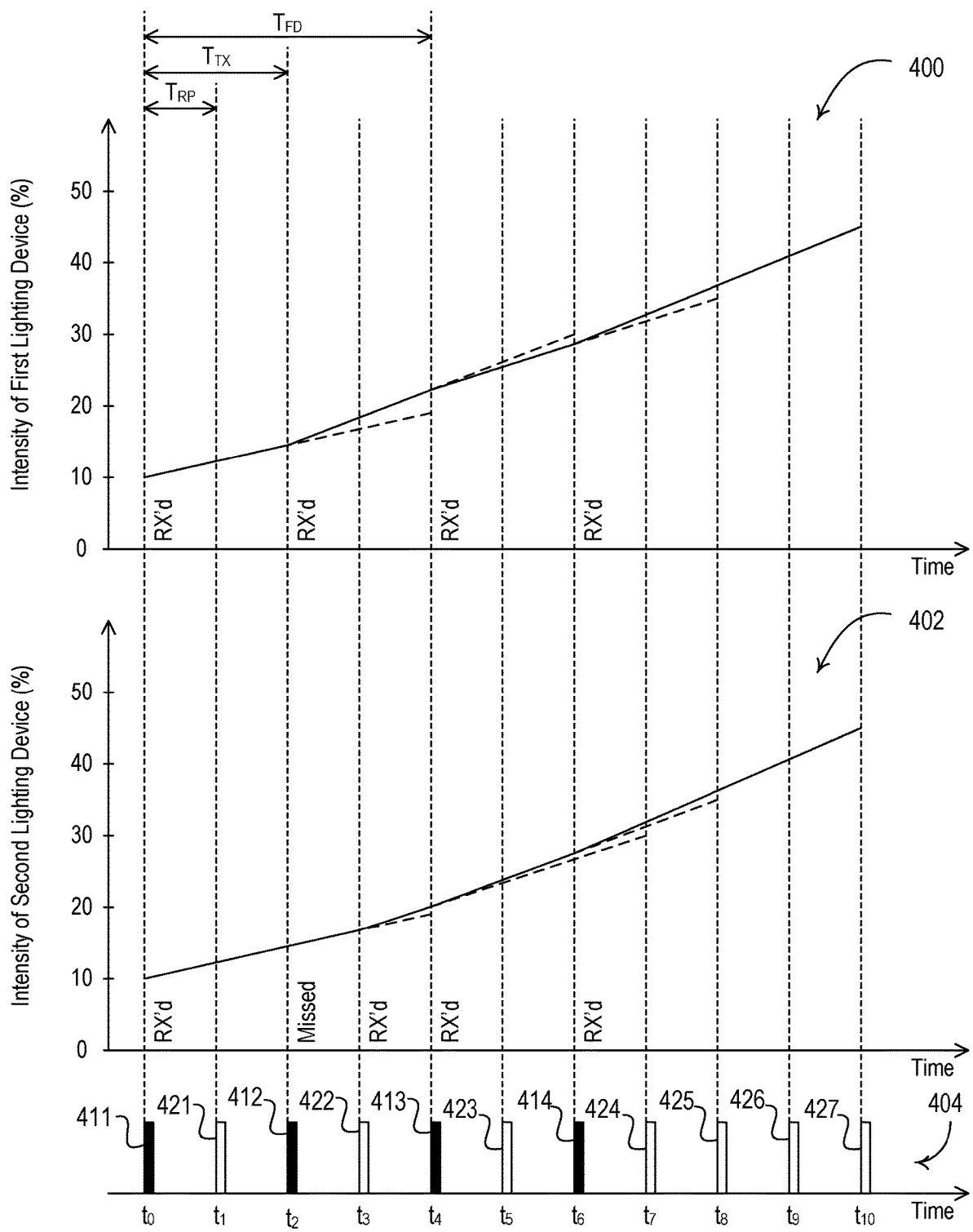
FIG. 4 includes plots of intensity level versus time that depict an example of controlling multiple lighting devices in a load control system.

FIG. 4 includes plots 400, 402 that depict examples of controlling (e.g., adjusting the intensity level of) lighting devices in a load control system (e.g., the lighting devices 112a, 112b, 122 of the load control system 100 and/or the lighting devices 204a, 204b). The lighting devices may be configured to adjust their respective intensity levels in response to received command messages. As illustrated in a sequence diagram 404 at the bottom of FIG. 4, a plurality of move-to-level command messages 411, 412, 413, 414 may be periodically transmitted (e.g., at a transmission interval). The move-to-level command messages 411-414 (e.g., indicated by the filled transmission blocks) may be transmitted in response to a user input (e.g., a rotation of a rotation portion). As described herein, the move-to-level command messages 411-414 may include an updated intensity level $L_{NEW}$ to which the lighting devices is to change to and a fade period $T_{FD}$ (e.g., an amount of time over which the intensity level is changed to the updated intensity level $L_{NEW}$ at the lighting devices). Further, one or more repeat command messages of the previous move-to-level command message (e.g., the immediately-preceding move-to-level command) may be periodically transmitted. As illustrated in FIG. 4, repeat command messages 421, 422, 423, 424, 425, 426, 427 may be periodically transmitted. The repeat command messages 421-427 may include the same move-to-level command of the previous move-to-level command message.

As described herein, the move-to-level command messages 411-414 and the repeat command messages 421-427 may each include the intensity level $L_{NEW}$ and a fade period $T_{FD}$. The updated intensity level $L_{NEW}$ of each move-to-level command message 411-414 may be dependent upon the amount of rotation of the rotation portion between successive move-to-level command messages (e.g., from the beginning to the end of one of the transmission intervals $T_{TX}$, such as between $t_0$ and $t_2$ as shown in FIG. 4). The fade period $T_{FD}$ may be a period of time that is longer than the transmission interval $T_{TX}$ and the repeat interval $T_{RP}$, which may provide smooth intensity level transitions. Referring to FIG. 4, the fade period $T_{FD}$ may include a period of time that is twice as long as the transmission interval $T_{TX}$ (e.g., the period of time at which command messages are transmitted). When the fade period $T_{FD}$ includes a period of time that is longer than the transmission interval $T_{TX}$, the lighting device's transitions to updated intensity levels may be ongoing while subsequent move-to-level command messages are received.

During rotation of the rotation portion, one or more move-to-level command messages 411-414 may be transmitted at the transmission interval $T_{TX}$. Similarly, one or more repeat command messages 421-427 of a previous move-to-level command message 411-414 may be transmitted at the repeat interval $T_{RP}$. Since the fade period $T_{FD}$ is longer than the transmission interval $T_{TX}$, the lighting device may not stop adjusting the intensity level of the lighting device until at least one subsequent move-to-level command message is received. For example, the lighting device may continue to adjust its intensity level, without stops or interruption in the adjustment, as subsequent move-to-level command messages are received. Further, as the intensity level is being adjusted in response to rotations of the rotation portion, which may, for example, be perceived to be smooth adjustments, stops or interruptions in adjustment of the intensity level may generate visibly stepped, irregular, or unsmooth adjustments in the intensity level of the lighting device. One or more of the transmitted move-to-level command messages 411-414 and/or repeat command messages 421-427 of the move-to-level command may not be received. However, as the fade time included in a move-to-level command message is longer than the transmission interval $T_{TX}$ plus the repeat interval $T_{RP}$, the lighting device may receive the repeat command messages after a subsequent move-to-level command before adjustment of the intensity level is stopped. As a result, the lighting device may not stop changing the intensity level until the rotation of the rotation portion has stopped, which may reduce the visible flicker of lighting devices.

At time $t_0$, for example, in response to rotation of a rotation portion, a first move-to-level command message 411 may be transmitted. The first move-to-level command message 411 may include a command for the lighting devices to transition to an intensity level of 18% over the fade period $T_{FD}$ (e.g., 200 milliseconds). As illustrated in FIG. 4, the both lighting devices may initially be at an intensity level of 10%. The lighting devices, in response to receiving the first move-to-level command message 411, may begin to transition to the intensity level of 18% over the fade period $T_{FD}$. At time $t_1$ (e.g., the repeat interval $T_{RP}$ of time after time $t_0$), a repeat command message 421 may be transmitted. The repeat command message 421 may include a repeat of the command of the first move-to-level command message 411.

At time $t_2$, (e.g., the transmission interval $T_{TX}$ of time after time $t_0$), in response to continued rotation, a second move-to-level command message 412 may be transmitted. The second move-to-level command message 412 may include a command for lighting devices to transition to an intensity level of 30%. The second move-to-level command message 412 may be received by the first lighting device, and the first lighting device may begin to transition to the intensity level of 30% over the fade period $T_{FD}$ (e.g., rather than continuing to transition to the intensity level of 18% in response to the first move-to-level command message 411 as indicated by the dashed line in FIG. 4). However, the second move-to-level command 412 may not be received (e.g., missed) by the second lighting device, and second lighting device may continue to transition to the intensity level of 18% (e.g., based on the first move-to-level command message 411). At time $t_3$, a repeat command message 422 may be transmitted. The repeat command message 422 may include a repeat of the command of the second move-to-level command message 412. The repeat command message 422 may be received by the second lighting device, and the second lighting device may then being to transition to the intensity level of 30% over the fade time $T_{FD}$ (e.g., rather than continuing to transition to the intensity level of 18% in response to the first move-to-level command message 411 as indicated by the dashed line).

At time $t_4$, a third move-to-level command message 413 may be transmitted, for example, in response to continued rotation of the rotation portion. The third move-to-level command message 413 may include a command for the lighting devices to transition to an intensity level of 35% over the fade time $T_{FD}$. The lighting devices may both receive the third move-to-level command message 413 and begin to transition to the intensity level of 35% over the fade time $T_{FD}$ (e.g., rather than continuing to transition to the intensity level of 30% in response to the first move-to-level command message 411 and/or the repeat command message 422 as indicated by the dashed lines in FIG. 4). At time $t_5$, a repeat command message 423 may be transmitted, which may include a repeat of the command of the third move-to-level command message 413. At $t_6$, in response to a final amount of rotation, a fourth move-to-level command message 414 may be transmitted. The fourth move-to-level command message 414 may include a command for the lighting device to transition to the intensity level of 45% over the fade time $T_{FD}$. The lighting devices may both receive the fourth move-to-level command message 414 and begin to transition to the intensity level of 45% over the fade time $T_{FD}$. As described herein, after rotation has stopped, a number of repeat command messages including the last command (e.g., the command of the fourth move-to-level command message 414) may be transmitted. For example, as illustrated in FIG. 4, repeat command messages 424, 425, 426, 427 may be transmitted at times $t_7$, $t_8$, $t_9$, and $t_{10}$, respectively.

As illustrated in FIG. 4, a plurality of move-to-level command messages and repeat command messages including the command of the previous move-to-level command message may be transmitted to a plurality of lighting devices in response to a user input (e.g., rotation of the rotation portion). Further, one or more of the transmitted move-to-level command messages and/or the repeat command messages may not be received by one or more of the controllable lighting devices. If, however, the fade period $T_{FD}$ is longer than the transmission interval $T_{TX}$, a missed command message may not provide a noticeable difference in the intensity levels of the respective lighting devices. In addition, the intensity levels of the respective lighting devices may begin to converge back together as subsequent move-to-level command message and repeat command messages are received. Further, the intensity levels of the respective lighting devices may eventually end up at the same intensity level in response to receiving the last move-to-level command message (e.g., the fourth move-to-level command 414) and/or the subsequent repeat command messages (e.g., the repeat command messages 424-427). For example, as shown in FIG. 4, even though the second move-to-level command message 412 is missed by the second lighting device at time $t_2$, the both lighting devices may eventually reach the intensity level of 45% at time $t_{10}$ and the differences in the intensity level of the respective lighting devices may be minimal.

Figure 5A:
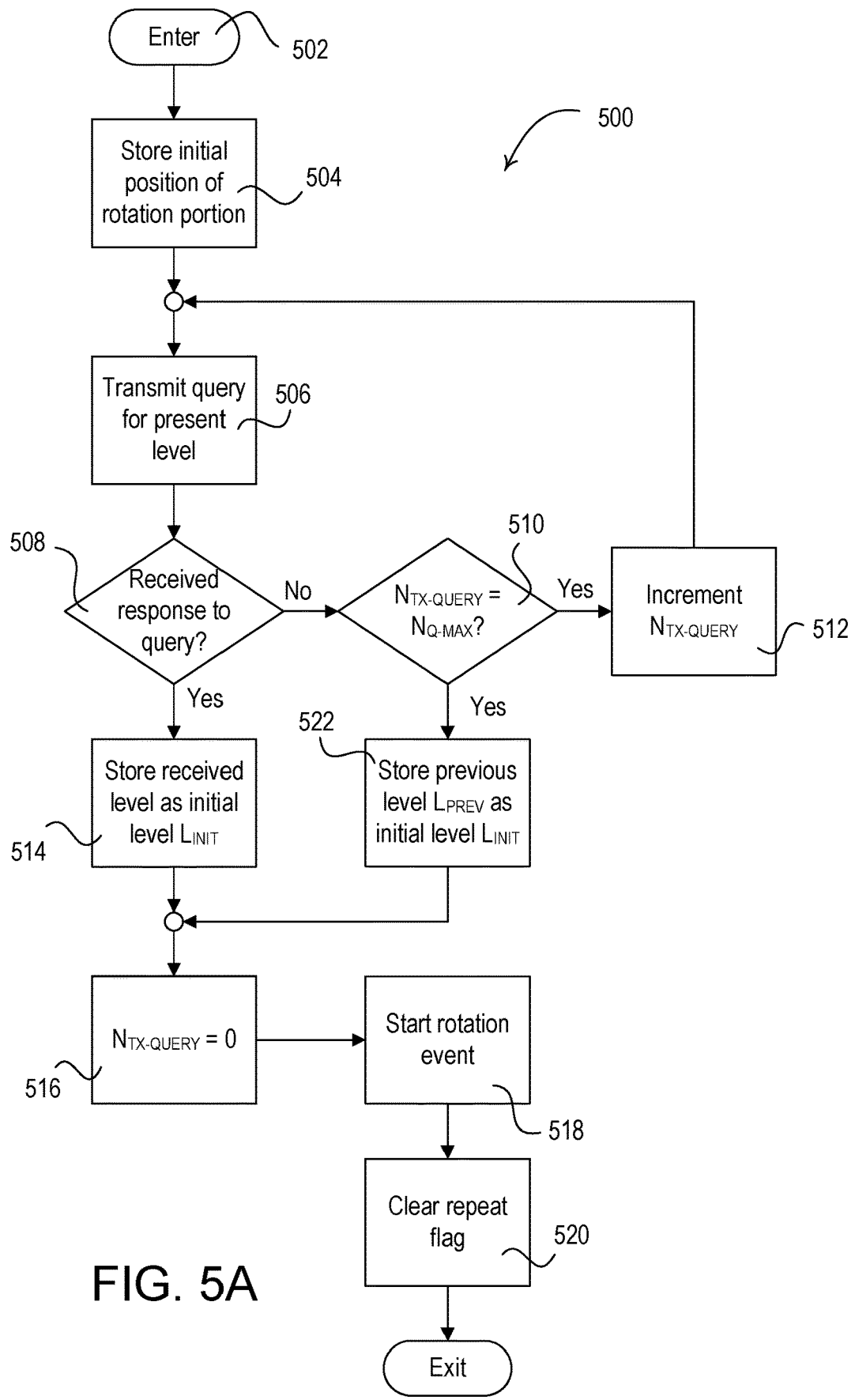
FIGS. 5A and 5B are flowcharts depicting example procedures for controlling lighting devices in a load control system.

FIG. 5A is a flowchart depicting an example procedure 500 for controlling (e.g., adjusting the intensity level of) at least one lighting device in a load control system. The procedure 500 may be performed at one or more devices in the load control system. For example, the procedure 500, or portions thereof, may be performed by a control device, such as a remote control device (e.g., the remote control device 116, 202), another controller device (e.g., the remote control device 150, the occupancy sensor 160, the daylight sensor 170, and/or the network device 190), a system controller (e.g., the system controller 180), a master device, and/or another computing device. The procedure 500 may be performed: after awakening from a sleep state; after identifying a user event (e.g., actuation, rotation, finger swipe, etc.); and/or a proximity sensing event (e.g., a sensing circuit sensing an occupant near the remote control device). For example, the procedure 500 may be executed at 502 by a remote control device in response to a rotation of a rotation portion (e.g., when the rotation portion 118 of the remote control device 116 is first rotated), which may cause the remote control device to wake up. The procedure 500 may be used by the remote control device to determine an initial state (e.g., an initial intensity level) for a lighting device (e.g., lighting devices 204a, 204b). The procedure 500 may be executed once when the remote control device wakes up in response to the rotation of the rotation portion.

At 504, the control device may store an initial position (e.g., an initial angular position) of the rotation portion. At 506, the control device may transmit a status query message requesting the present intensity level of the lighting device. At 508, the control device may determine whether a response (e.g., a status response message) to the status query message has been received or not. If the response to the status query message has not been received at 508, the control device may determine whether a variable $N_{TX\text{-}QUERY}$ is equal to a maximum query value $N_{Q\text{-}MAX}$ or not at 510. The variable $N_{TX\text{-}QUERY}$ may indicate the number of query messages that have been transmitted and the maximum query value $N_{Q\text{-}MAX}$ may indicate the maximum number of query messages that may be transmitted. If the variable $N_{TX\text{-}QUERY}$ is not equal to the maximum query value $N_{Q\text{-}MAX}$ at 510, the control device may increment the variable $N_{TX\text{-}QUERY}$ at 512 and transmit another status query message for querying for the present intensity level at 506.

When a response to the query message has been received at 508, the control device may store a received intensity level (e.g., that was included in the response to the query message) as an initial level $L_{INIT}$ at 514. The control device may set the variable $N_{TX\text{-}QUERY}$ to zero at 516, and may start a rotation event at 518. During the rotation event, the control device may periodically transmit command messages (e.g., move-to-level command messages and repeat command messages) to the lighting device (e.g., during procedure 550 described below with reference to FIG. 5B). At 520, the control device may clear a repeat flag (e.g., to prepare for execution of the procedure 550), and the procedure 500 may exit. The repeat flag may include an indication of whether the device is to transmit a move-to-level command message or a repeat command message during the procedure 550 (e.g., as will be described in greater detail below with reference to FIG. 5B). When a response to the query message has not been received at 508, but the variable $N_{TX\text{-}QUERY}$ is equal to the maximum query value $N_{Q\text{-}MAX}$ (e.g., the number of status queries transmitted is equal to the maximum number of queries that may be transmitted) at 510, a previous intensity level $L_{PRES}$ may be stored as the initial level $L_{INIT}$ at 522. For example, the previous intensity level $L_{PRES}$ may be an intensity level to which the control device controlled the lighting device at the end of a previous rotation event. The control device may then set the variable $N_{TX\text{-}QUERY}$ to zero at 516, start a rotation event at 518, and clear the repeat flag at 520, before the procedure exits.

Figure 5B:
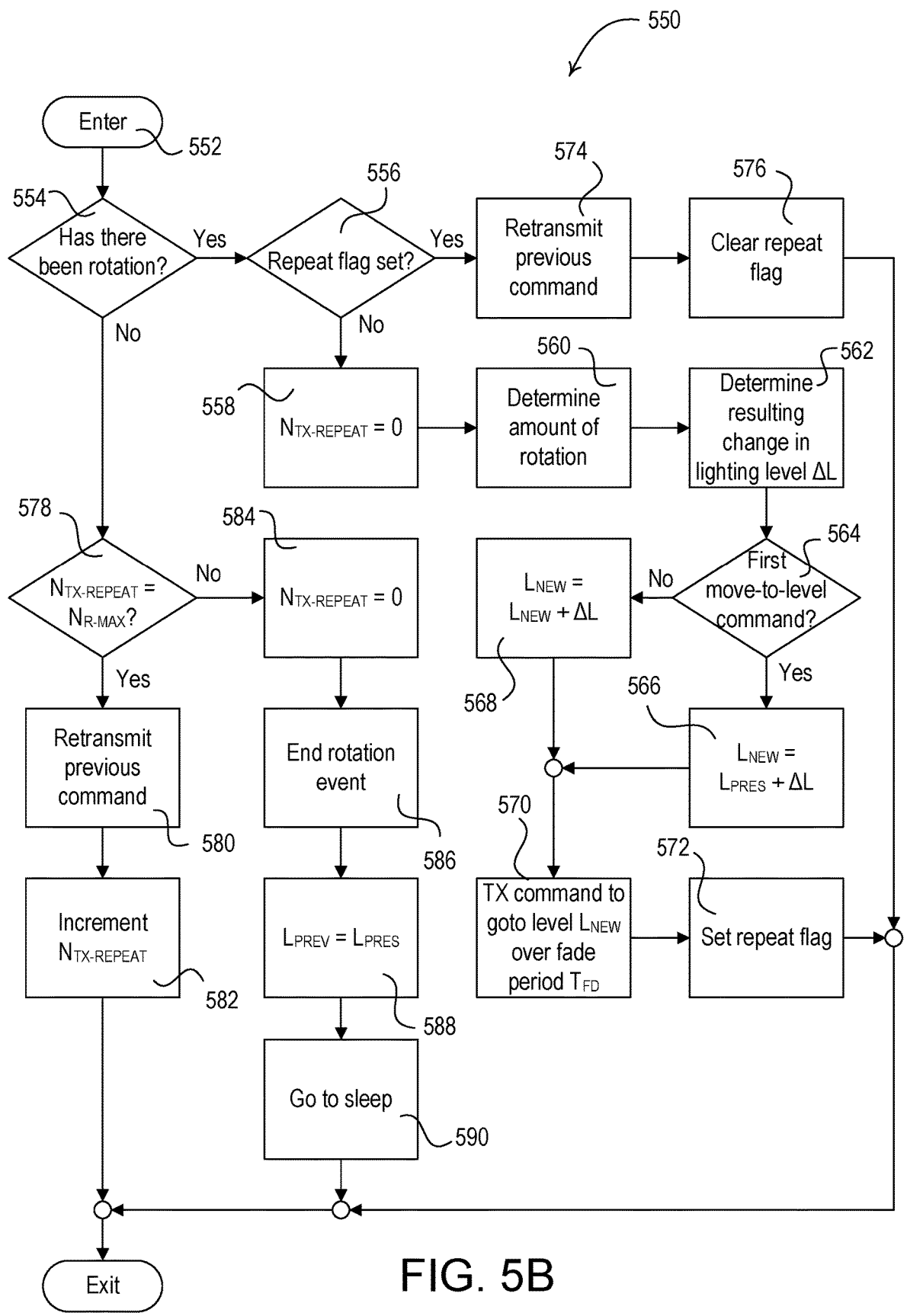

FIG. 5B is a flowchart depicting an example procedure 550 for controlling (e.g., adjusting the intensity level of) at least one lighting device in a load control system. The procedure 550 may be performed at one or more devices in the load control system. For example, the procedure 550, or portions thereof, may be performed by a control device, such as, a remote control device (e.g., the remote control device 116, 202), another controller device (e.g., the remote control device 150, the occupancy sensor 160, the daylight sensor 170, and/or the network device 190), a system controller (e.g., the system controller 180), a master device, and/or another computing device. The procedure 500 may be performed: after awakening from a sleep state; after identifying a user event (e.g., actuation, rotation, finger swipe, etc.); and/or a proximity sensing event (e.g., a sensing circuit sensing an occupant near the remote control device). For example, the procedure 550 may be executed periodically at 552 by a remote control device during a rotation event (e.g., which may be started at 524 of the procedure 500). The procedure 550 may be used by the remote control device to transmit command messages (e.g., move-to-level command messages and repeat command messages) to control the intensity level of the lighting device during the rotation event. The procedure 550 may be executed periodically at the repeat interval $T_{RP}$ (e.g., half of the transmission interval $T_{TX}$) until the device returns to a sleep state.

At 554, the control device may determine whether rotation of the rotation portion (e.g., rotation of the rotation portion 118 of the remote control device 116) has occurred or not. For example, when the procedure 550 is first executed after the rotation event has started, the control device may determine at 554 as to whether rotation of the rotation portion has occurred or not since the initial position of the knob is stored at 504 of the procedure 500 shown in FIG. 5A. When the procedure 550 is subsequently executed during the rotation event, the control device may determine at 554 as to whether rotation of the rotation portion has occurred or not within the last transmission interval $T_{TX}$. If there has been rotation of the rotation portion at 554, the control device may determine whether a repeat flag is set or not at 556. The repeat flag may include an indication of whether the device is to transmit a move-to-level command message or a repeat command message. If the repeat flag is not set at 556, the control device may initialize a variable $N_{TX\text{-}REPEAT}$ (e.g., set to 0) at 558. For example, the variable $N_{TX\text{-}REPEAT}$ may include an indication of the number of times that a particular move-to-level command has been repeated at the end of the rotation event (e.g., as will be described in greater detail below).

At 560, the control device may determine the amount of rotation of the rotation portion (e.g., a change in an angular portion of the rotation portion). For example, when the procedure 550 is first executed after the rotation event has started, the control device may determine the amount of rotation of the rotation portion since the initial position of the knob is stored (e.g., at 504 of the procedure 500) at 560. When the procedure 550 is subsequently executed during the rotation event, the control device may determine the amount of rotation of the rotation portion within the last transmission interval $T_{TX}$ (e.g., since beginning of the last transmission interval $T_{TX}$) at 560. At 560, the control device may determine a change $\Delta L$ in the intensity level due to the amount of rotation based on the amount of rotation within the last transmission interval $T_{TX}$.

Next, the control device may determine an updated intensity level $L_{NEW}$ (e.g., to which to control the lighting device) for the next move-to-level command message based on the determined change $\Delta L$ in the intensity level due to the amount of rotation. For example, if this is the first move-to-level command message to be transmitted as part of the rotation event at 564, the control device may set the updated intensity level $L_{NEW}$ equal to an initial intensity level $L_{INIT}$ (e.g., as determined at 520 of the procedure 500) plus the determined change $\Delta L$ in the intensity level at 566. If this is not the first move-to-level command message to be transmitted as part of the rotation event at 564, the control device may set updated intensity level $L_{NEW}$ equal to the previous updated intensity level $L_{NEW}$ (e.g., the updated intensity level $L_{NEW}$ transmitted as part of the previous move-to-level command) plus the determined change $\Delta L$ in the intensity level at 568.

At 570, the control device may transmit a move-to-level command message. For example, the move-to-level command message may include the updated intensity level $L_{NEW}$ and a fade period $T_{FD}$. As described herein, the fade period $T_{FD}$ may be the amount of time over which to transition to the updated intensity level $L_{NEW}$. The fade period $T_{FD}$ may be a period of time that is longer that the transmission interval $T_{TX}$. The fade period $T_{FD}$ may be the same each time that the move-to-level command is transmitted. At 572, the control device may set the repeat flag, which may indicate that the first instance of the move-to-level command has been transmitted.

As described herein, the repeat flag may include an indication of whether the device to transmit a repeat command message as opposed to a move-to-level command message. If, the transmit flag is set at 556, the control device may transmit a repeat command message at 574. The repeat command message may include the move-to-level command that was previously transmitted (e.g., at 570). At 576, the control device may clear the repeat flag (e.g., which may indicate that the another move-to-level command message may been transmitted next).

If there has been rotation of the rotation portion at 554 (e.g., since the beginning of the last transmission interval $T_{TX}$), the control device may determine whether the variable $N_{TX-REPEAT}$ is equal to a maximum repeat value $N_{R-MAX}$ or not at 576. The maximum repeat value $N_{R-MAX}$ may include an indication of the maximum number of repeat command messages (e.g., the repeat command message indicate by un-filled transmission blocks in FIGS. 3A, 3B, 4) that may be transmitted at the end of the rotation event. If the variable $N_{TX-REPEAT}$ is not equal to the maximum repeat value $N_{R-MAX}$ at 578, the control device may transmit a repeat command message at 580. The repeat command message may include the move-to-level command that was previously transmitted (e.g., at 570). At 582, the control device may increment the variable $N_{TX-REPEAT}$, before the procedure 550 exits. If the variable $N_{TX-REPEAT}$ is equal to maximum repeat value $N_{R-MAX}$ at 578, the control device may reset the variable $N_{TX-REPEAT}$ to zero at 584 and end the rotation event at 586. At 558, the control device may store the present intensity level $L_{PRES}$ of the lighting device as a previous intensity level $L_{PRES}$ (e.g., which may set used at 522 of the procedure 500). At 590, the control device may enter a sleep state, before the procedure 550 exits.

Figure 6:
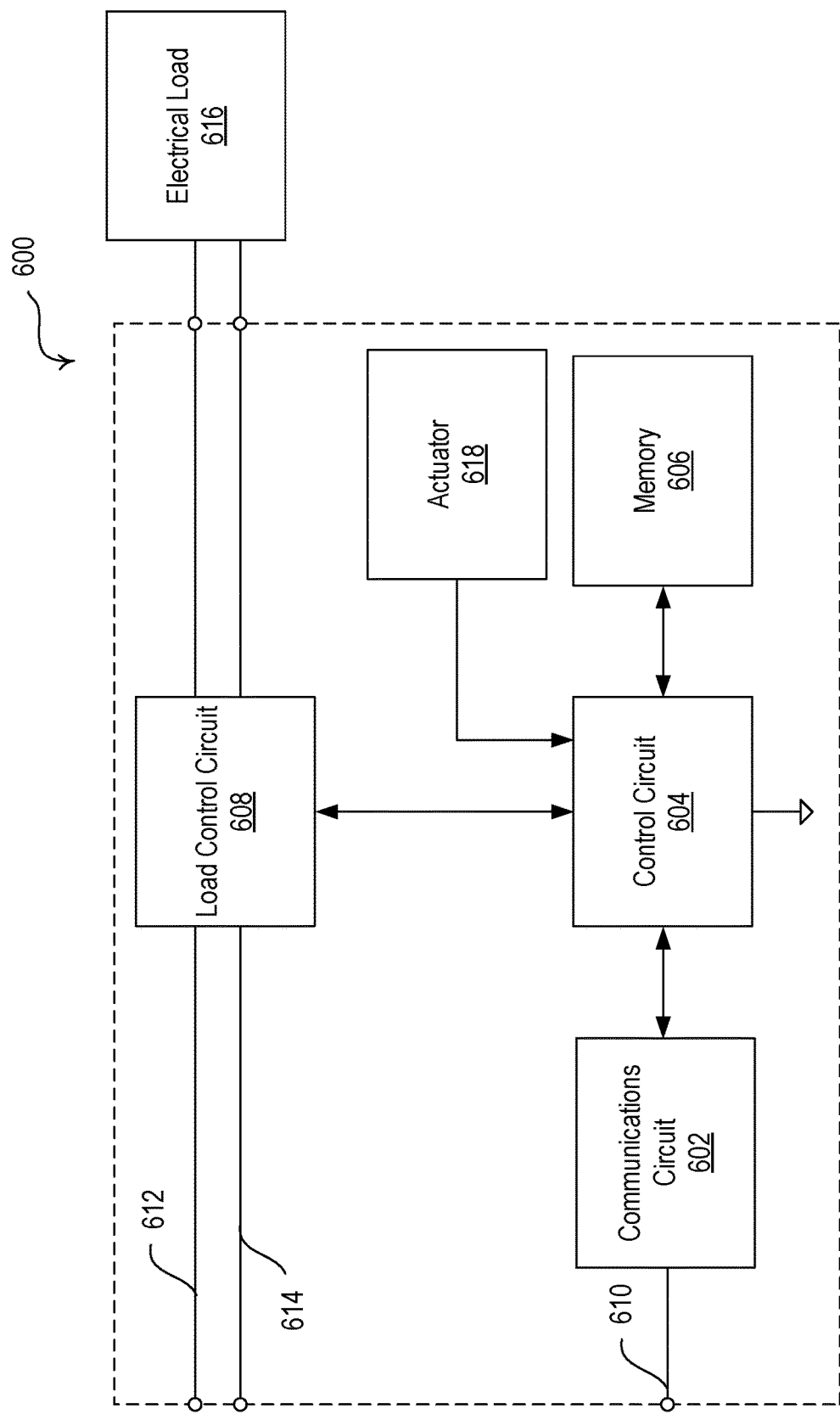
FIG. 6 is a block diagram of an example load control device.

FIG. 6 is a block diagram illustrating an example load control device, e.g., a load control device 600, as described herein. The load control device 600 may be a dimmer switch, an electronic switch, a lighting device (e.g., a light bulb, an electronic ballast for lamps, an LED driver for LED light sources, etc.), an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device. The load control device 600 may include a communications circuit 602. The communications circuit 602 may include a receiver, an RF transceiver, or other communications module capable of performing wired and/or wireless communications via communications link 610. The communications circuit 602 may be in communication with a control circuit 604. The control circuit 604 may include one or more general purpose processors, special purpose processors, conventional processors, digital signal processors (DSPs), microprocessors, integrated circuits, a programmable logic device (PLD), application specific integrated circuits (ASICs), or the like. The control circuit 604 may perform signal coding, data processing, power control, input/output processing, or any other functionality that enables the load control device 600 to perform as described herein.

The control circuit 604 may store information in and/or retrieve information from the memory 606. For example, the memory 606 may maintain a registry of associated control devices and/or control configuration instructions. The memory 606 may include a non-removable memory and/or a removable memory. The load control circuit 608 may receive instructions from the control circuit 604 and may control the electrical load 616 based on the received instructions. The load control circuit 608 may send status feedback to the control circuit 604 regarding the status of the electrical load 616. The load control circuit 608 may receive power via the hot connection 612 and the neutral connection 614 and may provide an amount of power to the electrical load 616. The electrical load 616 may include any type of electrical load.

The control circuit 604 may be in communication with an actuator 618 (e.g., one or more buttons) that may be actuated by a user to communicate user selections to the control circuit 604. For example, the actuator 618 may be actuated to put the control circuit 604 in an association mode and/or communicate association messages from the load control device 600.

Figure 7:
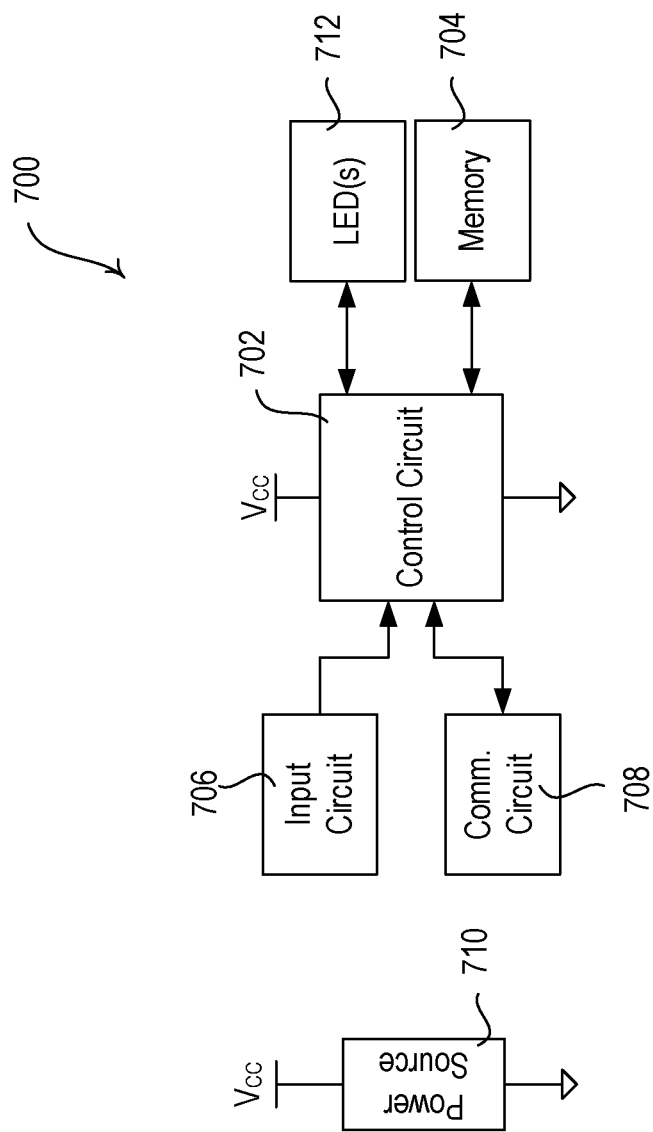
FIG. 7 is a block diagram of an example controller device.

FIG. 7 is a block diagram illustrating an example controller device 700 as described herein. The controller device 700 may be a remote control device, an occupancy sensor, a daylight sensor, a window sensor, a temperature sensor, and/or the like. The controller device 700 may include a control circuit 702 for controlling the functionality of the controller device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, and/or any other functionality that enables the controller device 700 to perform as described herein.

The control circuit 702 may store information in and/or retrieve information from the memory 704. The memory 704 may include a non-removable memory and/or a removable memory, as described herein.

The controller device 700 may include one or more light sources, such as one or more LEDs 712, for providing feedback to a user. The one or more LEDs 712 may be included in a status indicator and may be controlled by the control circuit 702. The control circuit 702 may control the LEDs 712 as described herein to provide feedback to the user.

The controller device 700 may include a communications circuit 708 for transmitting and/or receiving information. The communications circuit 708 may transmit and/or receive information via wired and/or wireless communications. The communications circuit 708 may include a transmitter, an RF transceiver, or other circuit capable of performing wired and/or wireless communications. The communications circuit 708 may be in communication with control circuit 702 for transmitting and/or receiving information.

The control circuit 702 may also be in communication with an input circuit 706. The input circuit 706 may include an actuator (e.g., one or more buttons), a rotating or sliding portion, or a sensor circuit (e.g., an occupancy sensor circuit, a daylight sensor circuit, or a temperature sensor circuit) for receiving input that may be sent to a device for controlling an electrical load. The input circuit 706 may also comprise a proximity sensing circuit for sensing an occupant in the vicinity of the controller device 700. For example, the controller device 702 may receive input from the input circuit 706 to put the control circuit 702 in an association mode and/or communicate association messages from the controller device 700. The control circuit 702 may receive information from the input circuit 706 (e.g. an indication that a button has been actuated, a rotation portion has been rotated, or information has been sensed) and/or an indication of a proximity sensing event. The input circuit 706 may comprise an actuator (e.g., a mechanical tactile switch) configured be actuated as an on/off event (e.g., in response to an actuation of the actuation portion 117). The input circuit 706 may also comprise a rotational position sensing circuit (e.g., a magnetic sensing circuit, such as a Hall effect sensing circuit) for sensing rotations (e.g., the angular position and/or direction of rotation) of a rotation portion (e.g., the rotation portion 118). Each of the modules within the controller device 700 may be powered by a power source 710.

Figure 8:
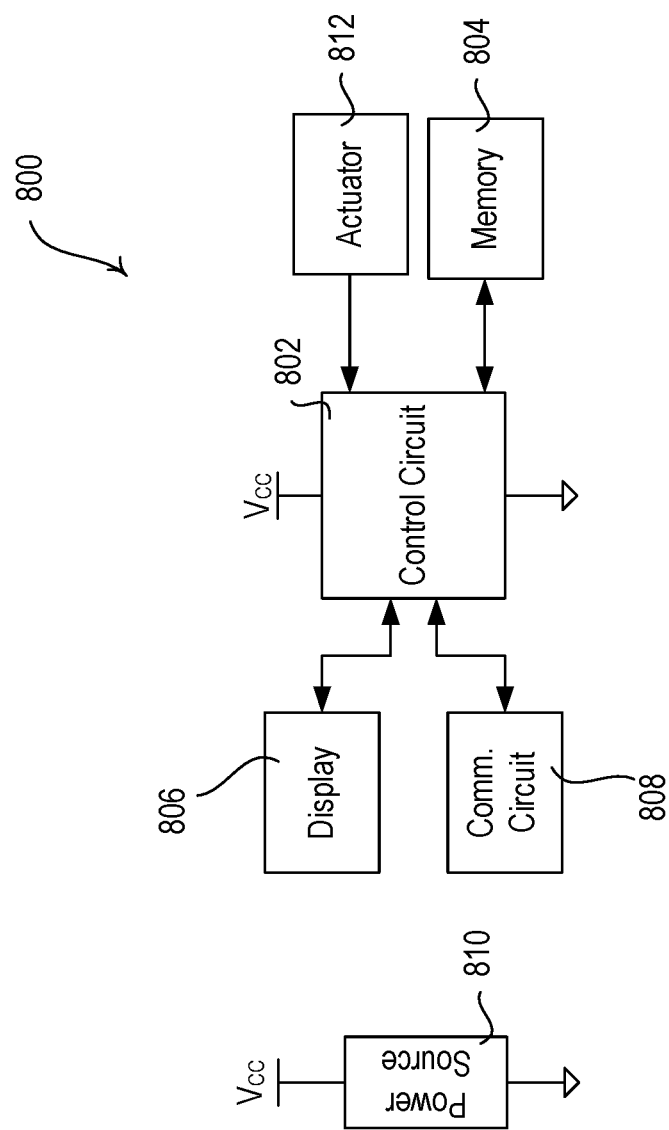
FIG. 8 is a block diagram of an example network device.

FIG. 8 is a block diagram illustrating an example network device 800 as described herein. The network device 800 may include the network device 190, for example. The network device 800 may include a control circuit 802 for controlling the functionality of the network device 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the network device 800 to perform as described herein. The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 800 may include a communications circuit 808 for transmitting and/or receiving information. The communications circuit 808 may perform wireless and/or wired communications. The communications circuit 808 may include an RF transceiver or other circuit capable of performing wireless communications via an antenna. Communications circuit 808 may be in communication with control circuit 802 for transmitting and/or receiving information.

The control circuit 802 may also be in communication with a display 806 for providing information to a user. The control circuit 802 and/or the display 806 may generate GUIs for being displayed on the network device 800. The display 806 and the control circuit 802 may be in two-way communication, as the display 806 may include a touch screen module capable of receiving information from a user and providing such information to the control circuit 802. The network device may also include an actuator 812 (e.g., one or more buttons) that may be actuated by a user to communicate user selections to the control circuit 802.

Each of the modules within the network device 800 may be powered by a power source 810. The power source 810 may include an AC power supply or DC power supply, for example. The power source 810 may generate a supply voltage $V_{CC}$ for powering the modules within the network device 800.

Figure 9:
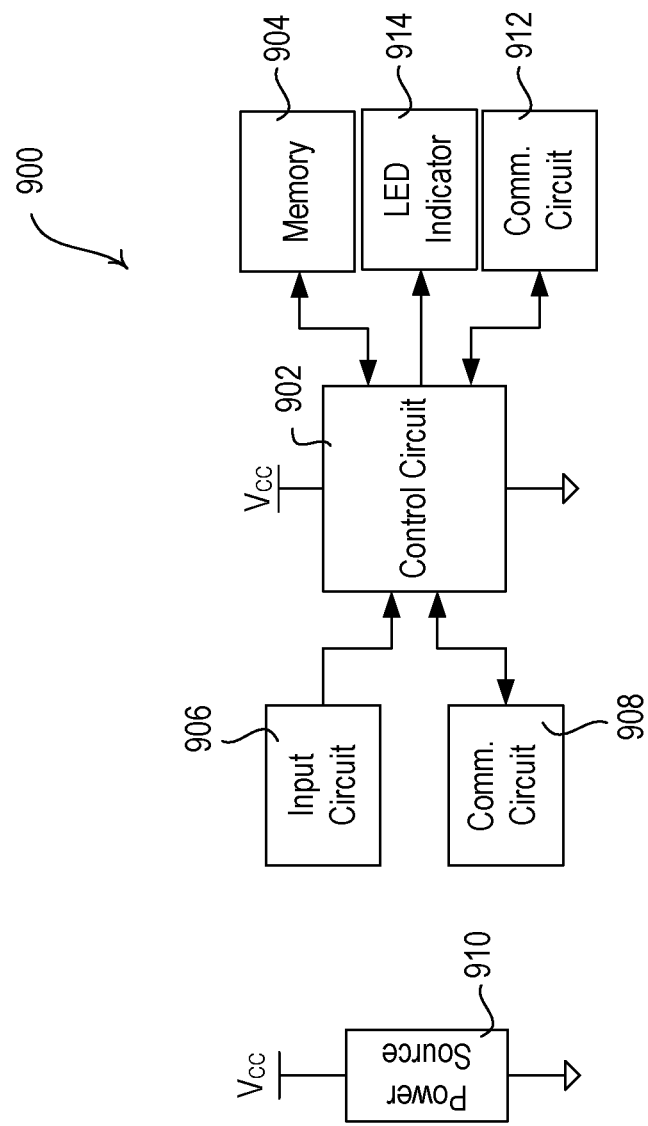
FIG. 9 is a block diagram of an example system controller (e.g., a hub device).

FIG. 9 is a block diagram illustrating an example system controller 900 (e.g., a hub device) as described herein. The system controller 900 may include a control circuit 902 for controlling the functionality of the system controller 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the system controller 900 to perform as described herein. The control circuit 902 may store information in and/or retrieve information from the memory 904. The memory 904 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 900 may include a communications circuit 908 for transmitting and/or receiving information. The communications circuit 908 may perform wireless and/or wired communications. The system controller 900 may also, or alternatively, include a communications circuit 912 for transmitting and/or receiving information. The communications circuit 912 may perform wireless and/or wired communications. Communications circuits 908 and 912 may be in communication with control circuit 902. The communications circuits 908 and 912 may include RF transceivers or other communications modules capable of performing wireless communications via an antenna. The communications circuit 908 and communications circuit 912 may be capable of performing communications via the same communication channels or different communication channels. For example, the communications circuit 908 may be capable of communicating (e.g., with a network device, over a network, etc.) via a wireless communication channel (e.g., BLUETOOTH®, near field communication (NFC), WI-FI®, WIMAX®, cellular, etc.) and the communications circuit 912 may be capable of communicating (e.g., with control devices and/or other devices in the load control system) via another wireless communication channel (e.g., ZIGBEE®, THREAD®, or a proprietary communication channel, such as CLEAR CONNECT™).

The control circuit 902 may be in communication with an LED indicator 914 for providing indications to a user. The control circuit 902 may be in communication with an actuator 906 (e.g., one or more buttons) that may be actuated by a user to communicate user selections to the control circuit 902. For example, the actuator 906 may be actuated to put the control circuit 902 in an association mode and/or communicate association messages from the system controller 900.

Each of the modules within the system controller 900 may be powered by a power source 910. The power source 910 may include an AC power supply or DC power supply, for example. The power source 910 may generate a supply voltage $V_{CC}$ for powering the modules within the system controller 900.

Although features and elements are described herein in particular combinations, each feature or element can be used alone or in any combination with the other features and elements. For example, the functionality described herein may be described as being performed by a control device, such as a remote control device or a lighting device, but may be similarly performed by a system controller or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A remote control device, comprising:
a memory;
a user interface; and
a processor, configured to:
receive an indication of a user interaction via the user interface;
transmit a first command message after receipt of the indication of the user interaction, wherein the first command message comprises a first command, the first command comprising a first intensity level and a fade period, wherein the first command is configured to adjust to the first intensity level over the fade period;
transmit a second command message, after a transmission interval from when the first command message was transmitted, wherein the second command message comprises a second command, the second command comprising a second intensity level and the fade period, wherein the second command is configured to adjust to the second intensity level over the fade period, and wherein the fade period is longer than the transmission interval.

2. The remote control device of claim 1, wherein the user interface comprises a rotation portion, and the processor is configured to periodically transmit command messages at the transmission interval while the rotation portion is being rotated.

3. The remote control device of claim 2, wherein the processor is configured to determine the second intensity level based on the first intensity level and an amount of rotation of the rotation portion during the transmission interval.

4. The remote control device of claim 1, wherein the processor is configured to transmit a repeat command message between the first command message and the second command message at the end of a repeat interval from the beginning of the present transmission interval, the repeat command message comprising the first command to adjust to the first intensity level over the fade period.

5. The remote control device of claim 4, wherein the repeat interval is half of the transmission interval.

6. The remote control device of claim 1, wherein the fade period is twice as long as the transmission interval.

7. A remote control device, comprising:
a memory;
a user interface; and
a processor, configured to:
receive an indication of a first user interaction via the user interface;
periodically transmit command messages at a transmission interval in response to receiving the indication of the first user interaction, each of the command messages comprising a respective command for adjusting to a respective intensity level over a fade period; and
transmit at least one repeat command message between the periodic transmissions of the command messages at the end of a repeat interval from the beginning of the present transmission interval, each repeat command message comprising the respective command included in the command message transmitted at the beginning of the present transmission interval, wherein the repeat interval is at most half the transmission interval.

8. The remote control device of claim 7, wherein the user interface comprises a rotation portion, and the processor is configured to periodically transmit command messages at the transmission interval while the rotation portion is being rotated.

9. The remote control device of claim 8, wherein the processor is further configured to:
detect an end of rotation of the rotation portion; and
transmit a plurality of repeat command messages on a condition that the end of the rotation of the rotation portion is detected, each of the repeat command messages including a command of a last one of the command message to be transmitted.

10. The remote control device of claim 7, wherein the processor is further configured to: receive an indication of a second user interaction via the user interface;
transmit a command message including a direct command based on the second user interaction; and
transmit a plurality of repeats messages after the command message, each of the repeat command messages including the direct command of the command message.

11. The remote control device of claim 10, wherein the user interface comprises an actuation portion, and wherein the second user interaction is an actuation of the actuation portion.

12. The remote control device of claim 7, wherein the fade period is twice as long as the transmission interval.

13. A load control system comprising:
a remote control device configured to:
detect a user interaction;
in response to the detection of the user interaction, periodically transmit command messages at a transmission interval, wherein each command message comprises a command configured to control a plurality of lighting devices to a respective intensity level over a fade period, wherein the fade period is longer than the periodic transmission interval; and
transmit a repeat message after a repeat interval from each previously transmitted command message, wherein the repeat message comprises the same command in the previously transmitted command message;
a first lighting device configured to control an intensity level of a first lighting load, the first lighting device configured to:
receive a first command message from the remote control device, wherein the first command message comprises a first intensity level;
in response to the receipt of the first command message, initiate adjustment of the intensity level of the first lighting load toward the first intensity level over the fade period;
during the fade period over which the intensity level of the first lighting load is being controlled, receive a second command message from the remote control device; and
in response to the receipt of the second command message, initiate adjustment of the intensity level of the first lighting load towards the second intensity level over the fade period; and a second lighting device configured to control an intensity level of a second lighting load, the second lighting device configured to:
  receive a repeat message corresponding to the first command message from the remote control device, wherein the repeat message comprises the first intensity level, and wherein the repeat message is transmitted by the remote control device after the first command message;
  in response to the receipt of the repeat message, initiate adjustment of the intensity level of the second lighting load toward the first intensity level over the fade period;
  during the fade period over which the intensity level of the second lighting load is being controlled, receive the second command message from the remote control device; and
  in response to the receipt of the second command message, initiate adjustment of the intensity level of the second lighting load toward the second intensity level over the fade period.

14. The load control system of claim 13, wherein the remote control device comprises a rotation portion, and wherein the user interaction is rotation of the rotation portion.

15. The load control system of claim 14, wherein the second command message is based on the first command message and an amount of rotation of the rotation portion during the transmission interval.

16. The load control system of claim 14, wherein the remote control device is further configured to:
  detect an end of rotation of the rotation portion; and
  transmit a plurality of repeat command messages on a condition that the end of the rotation of the rotation portion is detected, each of the repeat command messages including a command of a last periodically transmitted command message.

17. The load control system of claim 13, wherein the repeat interval is half of the transmission interval.

18. The load control system of claim 13, wherein the fade period is twice as long as the transmission interval.

19. The load control system of claim 13, wherein the remote control device comprises as actuation portion, and wherein the remote control device is further configured to:
  detect an actuation of the actuation portion;
  transmit a command message including a direct command based on the detected actuation of the actuation portion; and
  periodically transmit a plurality of repeat messages after the command message, each of the repeat command messages including the direct command of the command message, and wherein the plurality of repeat messages are periodically transmitted at the repeat interval.

20. A method comprising:
receiving an indication of a user interaction via a user interface;
transmitting a first command message after receipt of the indication of the user interaction, wherein the first command message comprises a first command, the first command comprising a first intensity level and a fade period, wherein the first command is configured to adjust to the first intensity level over the fade period;
transmitting a second command message, after a transmission interval from when the first command message was transmitted, wherein the second command message comprises a second command, the second command comprising a second intensity level and the fade period, wherein the second command is configured to adjust to the second intensity level over the fade period, and wherein the fade period is longer than the transmission interval.

21. The method of claim 20, wherein the user interface comprises a rotation portion, the method further comprising periodically transmitting command messages at the transmission interval while the rotation portion is being rotated.

22. The method of claim 21, further comprising determining the second intensity level based on the first intensity level and an amount of rotation of the rotation portion during the transmission interval.

23. The method of claim 20, further comprising transmitting a repeat command message between the first command message and the second command message at the end of a repeat interval from the beginning of the present transmission interval, the repeat command message comprising the first command to adjust to the first intensity level over the fade period.

24. The method of claim 23, wherein the repeat interval is at most half the transmission interval.

25. The method of claim 20, wherein the fade period is twice as long as the transmission interval.

26. A method comprising:
receiving an indication of a first user interaction via a user interface;
periodically transmitting command messages at a transmission interval in response to receiving the indication of the first user interaction, each of the command messages comprising a respective command for adjusting to a respective intensity level over a fade period; and
transmitting at least one repeat command message between the periodic transmissions of the command messages at the end of a repeat interval from the beginning of the present transmission interval, each repeat command message comprising the respective command included in the command message transmitted at the beginning of the present transmission interval, wherein the repeat interval is at most half the transmission interval.

27. The method of claim 26, wherein the user interface comprises a rotation portion, the method further comprising:
  periodically transmitting command messages at the transmission interval while the rotation portion is being rotated;
  detecting an end of rotation of the rotation portion; and
  transmitting a plurality of repeat command messages on a condition that the end of the rotation of the rotation portion is detected, each of the repeat command messages including a command of a last one of the command message to be transmitted.

28. The method of claim 26, further comprising:
receiving an indication of a second user interaction via the user interface;
transmitting a command message including a direct command based on the second user interaction; and
transmitting a plurality of repeats messages after the command message, each of the repeat command messages including the direct command of the command message.

29. The method of claim 28, wherein the user interface comprises an actuation portion, and wherein the second user interaction is an actuation of the actuation portion.

30. The method of claim 26, wherein the fade period is twice as long as the transmission interval.

31. At least one non-transitory-computer-readable storage medium comprising executable instructions for configuring at least one processor to:
- receive an indication of a user interaction via a user interface;
- transmit a first command message after receipt of the indication of the user interaction, wherein the first command message comprises a first command, the first command comprising a first intensity level and a fade period, wherein the first command is configured to adjust to the first intensity level over the fade period;
- transmit a second command message, after a transmission interval from when the first command message was transmitted, wherein the second command message comprises a second command, the second command comprising a second intensity level and the fade period, wherein the second command is configured to adjust to the second intensity level over the fade period, and wherein the fade period is longer than the transmission interval.

32. The at least one non-transitory-computer-readable storage medium of claim 31, wherein the user interface comprises a rotation portion, the method further comprising periodically transmitting command messages at the transmission interval while the rotation portion is being rotated.

33. The at least one non-transitory-computer-readable storage medium of claim 32, the executable instructions further for configuring the at least one processor to determine the second intensity level based on the first intensity level and an amount of rotation of the rotation portion during the transmission interval.

34. The at least one non-transitory-computer-readable storage medium of claim 31, the executable instructions further for configuring the at least one processor to transmit a repeat command message between the first command message and the second command message at the end of a repeat interval from the beginning of the present transmission interval, the repeat command message comprising the first command to adjust to the first intensity level over the fade period.

35. The at least one non-transitory-computer-readable storage medium of claim 34, wherein the repeat interval is at most half of the transmission interval.

36. The at least one non-transitory-computer-readable storage medium of claim 31, wherein the fade period is twice as long as the transmission interval.

37. At least one non-transitory-computer-readable storage medium comprising executable instructions for configuring at least one processor to:
- receive an indication of a first user interaction via a user interface;
- periodically transmit command messages at a transmission interval in response to receiving the indication of the first user interaction, each of the command messages comprising a respective command for adjusting to a respective intensity level over a fade period; and
- transmit at least one repeat command message between the periodic transmissions of the command messages at the end of a repeat interval from the beginning of the present transmission interval, each repeat command message comprising the respective command included in the command message transmitted at the beginning of the present transmission interval, wherein the repeat interval is at most half of the transmission interval.

38. The at least one non-transitory-computer-readable storage medium of claim 37, wherein the user interface comprises a rotation portion, the method further comprising:
- periodically transmitting command messages at the transmission interval while the rotation portion is being rotated;
- detecting an end of rotation of the rotation portion; and
- transmitting a plurality of repeat command messages on a condition that the end of the rotation of the rotation portion is detected, each of the repeat command messages including a command of a last one of the command message to be transmitted.

39. The at least non-transitory-one computer-readable storage medium of claim 37, the executable instructions further for configuring the at least one processor to:
- receive an indication of a second user interaction via the user interface;
- transmit a command message including a direct command based on the second user interaction; and
- transmit a plurality of repeats messages after the command message, each of the repeat command messages including the direct command of the command message.

40. The at least one non-transitory-computer-readable storage medium of claim 39, wherein the user interface comprises an actuation portion, and wherein the second user interaction is an actuation of the actuation portion.

41. The at least one non-transitory-computer-readable storage medium of claim 37, wherein the fade period is twice as long as the transmission interval.

* * * * *